US012252931B1

(12) United States Patent
Flannery et al.

(10) Patent No.: US 12,252,931 B1
(45) **Date of Patent: *Mar. 18, 2025**

(54) KEEPER APPARATUS TO MAINTAIN GATE IN PLANE WITH FRAME

(71) Applicant: Regalo International, LLC, Burnsville, MN (US)

(72) Inventors: Mark A. Flannery, Longboat Key, FL (US); Gary T. Schultze, Savage, MN (US); Nicholas E. Beattie, Saint Paul, MN (US); Michael P. Lane, Chaska, MN (US); Matthew A. Willms, Woodbury, MN (US)

(73) Assignee: Regalo International, LLC, Longboat Key, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,275

(22) Filed: Dec. 2, 2023

Related U.S. Application Data

(63) Continuation of application No. 17/508,900, filed on Oct. 22, 2021, now Pat. No. 11,834,898, which is a continuation of application No. 16/041,814, filed on Jul. 22, 2018, now Pat. No. 11,162,300.

(60) Provisional application No. 62/540,537, filed on Aug. 2, 2017.

(51) Int. Cl.

| | |
|---|---|
| ***E06B 7/32*** | (2006.01) |
| ***E05B 65/00*** | (2006.01) |
| ***E05C 3/16*** | (2006.01) |
| ***E06B 9/04*** | (2006.01) |
| *E06B 9/00* | (2006.01) |

(52) U.S. Cl.
CPC ............ *E06B 7/32* (2013.01); *E05B 65/0007* (2013.01); *E05C 3/167* (2013.01); *E06B 9/04* (2013.01); *E06B 2009/002* (2013.01)

(58) Field of Classification Search
CPC ........ E06B 2009/002; E06B 9/04; E06B 7/32; E06B 11/02; E05C 3/167
See application file for complete search history.

(56) References Cited

U.S. PATENT DOCUMENTS

| | | | | |
|---|---|---|---|---|
| 2,975,536 | A * | 3/1961 | Schindler ................ | E06B 11/02 52/656.8 |
| 5,657,809 | A | 8/1997 | Longoria | |
| 5,797,218 | A | 8/1998 | Holland | |
| 6,176,042 | B1 | 1/2001 | Rossman | |
| 7,334,624 | B2 | 2/2008 | Waldman | |
| 7,975,431 | B2 | 7/2011 | Flannery | |
| 8,196,348 | B2 | 6/2012 | Flannery | |
| 8,341,886 | B2 | 1/2013 | Yates | |
| 8,448,381 | B2 | 5/2013 | Flannery | |
| 8,745,922 | B1 | 6/2014 | Matsuda | |
| 9,382,740 | B2 | 7/2016 | Flannery et al. | |
| 9,382,750 | B1 | 7/2016 | Flannery et al. | |

(Continued)

*Primary Examiner* — Justin B Rephann

(57) ABSTRACT

A keeper apparatus engaged to the lower free end swinging corner portion of a gate, not to either of the upper and lower corner portions having the axis on which the gate swings, and not to the upper free end swinging corner portion where the gate has a main latch. The keeper apparatus joins the shortened ends of a horizontal gate support member and a vertical gate support member where, prior to engaging the keeper apparatus on the shortened ends, such intentionally manufactured shortened ends are free and spaced from each other.

14 Claims, 15 Drawing Sheets

(56) References Cited

U.S. PATENT DOCUMENTS

| | | | |
|---|---|---|---|
| 9,458,668 | B1 | 10/2016 | Flannery |
| 9,580,930 | B2 * | 2/2017 | Sadinsky .............. E04H 17/163 |
| 9,587,426 | B1 | 3/2017 | Flannery et al. |
| 9,879,453 | B1 | 1/2018 | Flannery et al. |
| 10,081,980 | B2 | 9/2018 | Birkert |
| 10,550,634 | B1 | 2/2020 | Holland |
| 2006/0081826 | A1 | 4/2006 | Cheng |
| 2006/0175028 | A1 | 8/2006 | Askinasi |
| 2008/0104888 | A1 | 5/2008 | Holmes |
| 2008/0265233 | A1 | 10/2008 | Flannery |
| 2009/0013604 | A1 | 1/2009 | Yates |
| 2009/0226246 | A1 | 9/2009 | Piper |
| 2011/0225890 | A1 | 9/2011 | Greenwood |
| 2012/0174484 | A1 | 7/2012 | Toro |
| 2012/0255234 | A1 | 10/2012 | Wang |
| 2012/0324792 | A1 | 12/2012 | Bertsch |
| 2013/0125470 | A1 | 5/2013 | Dunn |
| 2013/0221304 | A1 | 8/2013 | Wang |
| 2015/0101250 | A1 | 4/2015 | Marsden |
| 2015/0101253 | A1 | 4/2015 | Marsden |
| 2016/0069113 | A1 | 3/2016 | Birkert |
| 2017/0350165 | A1 | 12/2017 | Schort |
| 2018/0112457 | A1 | 4/2018 | Raffi |
| 2018/0148954 | A1 | 5/2018 | Raffi |

* cited by examiner

FIG. 5A
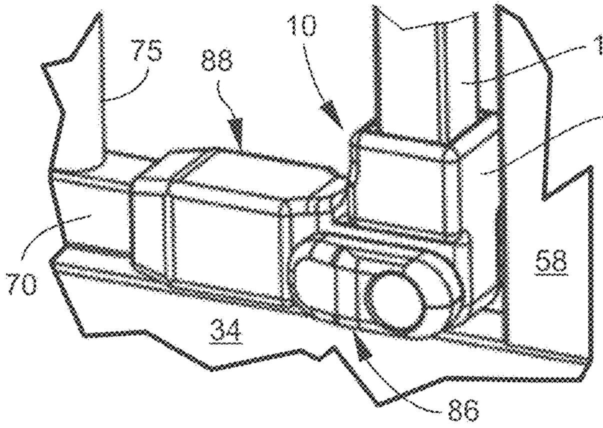
FIG. 5B
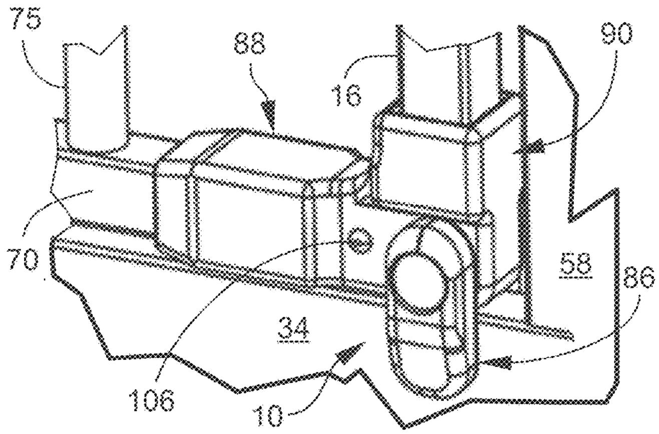
FIG. 5C
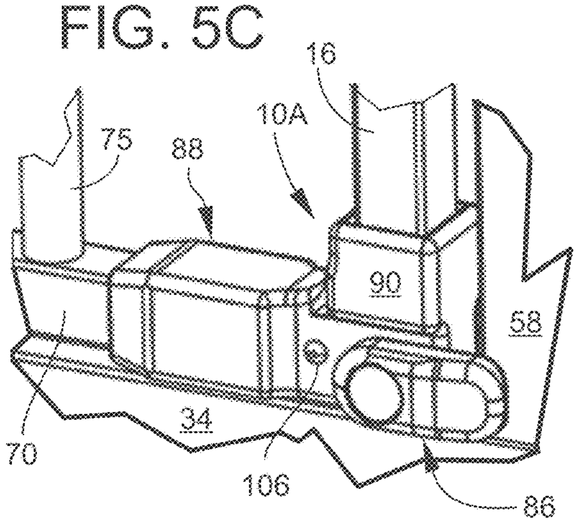
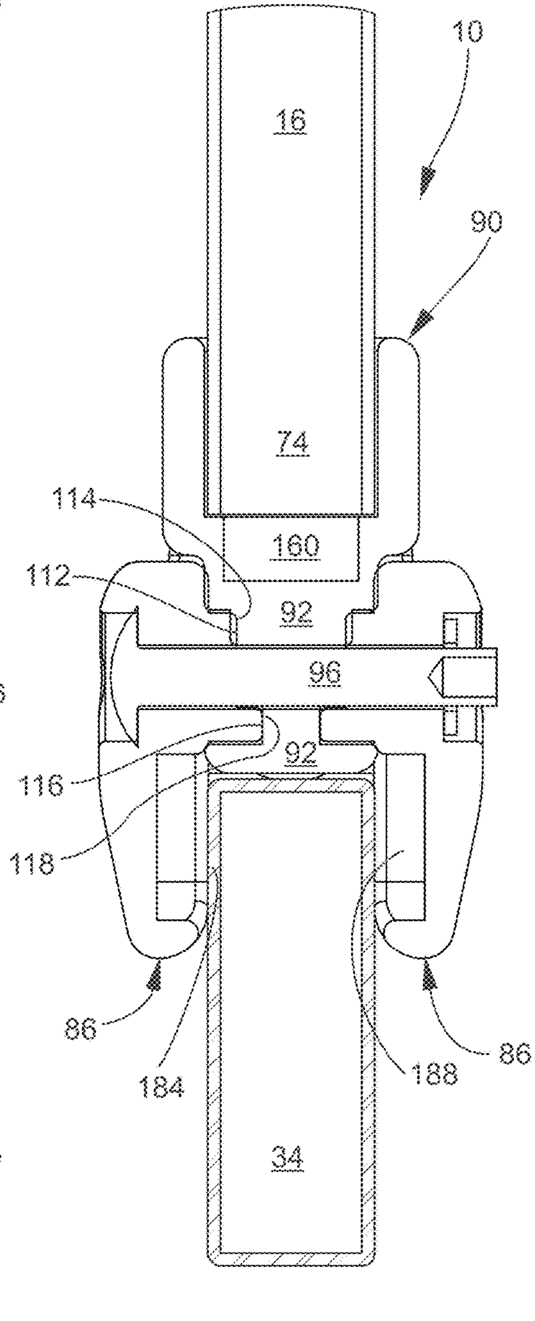
FIG. 5D

KEEPER APPARATUS TO MAINTAIN GATE IN PLANE WITH FRAME

This application is a continuation of U.S. patent application Ser. No. 17/508,900 filed Oct. 22, 2021 (U.S. Pat. No. 11,834,898 issued Dec. 5, 2023) and claims the benefit thereof under 35 U.S.C. § 120, which application is a continuation of U.S. patent application Ser. No. 16/041,814 filed Jul. 22, 2018 (U.S. Pat. No. 11,162,300 issued Nov. 2, 2021) and claims the benefit thereof under 35 U.S.C. § 120, which application claims the benefit under 35 U.S.C. 119(e) of U.S. Provisional Patent Application No. 62/540,537 filed Aug. 2, 2017, which nonprovisional and provisional applications are hereby incorporated by reference in their entireties into this application.

FIELD OF THE INVENTION

The present invention relates to a gated barrier, more particularly to a connection between the gate and the barrier frame, and specifically to a connection between the gate and the barrier frame at a specific lower corner portion of the gate.

BACKGROUND OF THE INVENTION

A juvenile gate placed at the top of a staircase is safer for an infant or toddler than an open top at the top of a staircase. A pet gate placed at the entrance to a kitchen to bar entry of a dog into the kitchen is safer for a father cooking and the dog than an open doorway that permits the dog a chance to get underfoot. Yet likely any and all devices have shortcomings.

SUMMARY OF THE INVENTION

A feature of the present invention is the provision in a gated barrier, of a frame that includes first and second frame ends and a frame lower member extending between the first and second frame ends, of a gate in the frame, the gate confronting the first and second frame ends, where the gate swingably engages the the first frame end, and where the gate is latchable to the second frame end, and of a keeper on at least one of the gate and frame, where the keeper is engagable between the gate and at least one of the frame lower member and frame second end to keep the gate engaged to the frame and to keep the gate in a common plane with the frame lower member, where the keeper is disengagable between such at least one of the frame lower member and frame second end to permit the gate to swing relative to the frame.

Another feature of the present invention is the provision in such a gated barrier, of the keeper being on the gate.

Another feature of the present invention is the provision in such a gated barrier, of the keeper being on the frame.

Another feature of the present invention is the provision in such a gated barrier, of the keeper being engaged between the gate and the frame lower member.

Another feature of the present invention is the provision in such a gated barrier, of the keeper being engaged between the gate and the frame second end.

Another feature of the present invention is the provision in such a gated barrier, of the keeper including two opposing faces that confront two opposing sides of one of the gate and frame.

Another feature of the present invention is the provision in such a gated barrier, of the keeper pivoting to an out-of-the-way position to permit the gate to swing.

Another feature of the present invention is the provision in such a gated barrier, of a first latch between the gate and the frame, where the first latch must be unlatched and the keeper must be disengaged prior to the gate being swingable relative to the frame.

Another feature of the present invention is the provision in such a gated barrier, of a first latch between the gate and the frame and a second latch between the gate and frame, where the first latch must be unlatched, where the second latch must be unlatched, and where the keeper must be disengaged prior to the gate being swingable relative to the frame.

Another feature of the present invention is the provision in such a gated barrier, of the gate including a corner portion defined by a first gate portion forming a junction with a second gate portion, where the first gate portion confronts the frame second end, where the second gate portion confronts the frame lower member, and where the keeper is engaged between the corner portion and at least one of the frame lower member and frame second end.

Another feature of the present invention is the provision in such a gated barrier, of the gate being fixed at one altitude in the frame.

Another feature of the present invention is the provision in a gated barrier, of a frame that includes first and second frame ends and a frame lower member extending between the first and second frame ends, of a gate in the frame, where the gate confronts the first and second frame ends, where the gate swingably engages the first frame end, and where the gate is latchable to the second frame end, of the gate having a free end vertically extending support member confronting the second frame end, of the gate having a lowermost horizontally extending support member, of the free end vertically extending support member having a lower end, of the lowermost horizontally extending support member having an outer end, and of the lower end and outer end being spaced from each other.

Another feature of the present invention is the provision in such a gated barrier, of a keeper apparatus being joined between the lower and outer ends.

Another feature of the present invention is the provision in such a gated barrier, of the keeper apparatus including a keeper on at least one of the gate and frame, where the keeper is engagable between the gate and at least one of the frame lower member and frame second end to keep the gate engaged to the frame and to keep the gate in a common plane with the frame lower member, where the keeper is disengagable between the at least one of the frame lower member and frame second end to permit the gate to swing relative to the frame.

Another feature of the present invention is the provision in a gated barrier, of a method for holding a gate in position with a minimal of movement relative to a frame, where the frame includes first and second frame ends and a frame lower member extending between the first and second frame ends, where the gate is in the frame, where the gate confronts the first and second frame ends, where the gate is swingably engaged to the first frame end, where the gate is latchable to the second frame end, where a keeper is on at least one of the gate and frame, where the keeper is engagable between the gate and at least one of the frame lower member and frame second end to keep the gate engaged to the frame and to keep the gate in a common plane with the frame lower member, where the keeper is disengagable between the at least one of the frame lower member and frame second end to permit the gate to swing relative to the frame.

Another feature of the present invention is the provision in such a gated barrier, of such a method where the method includes the step of determining a first strength of a first face of the gate, the first strength being determined by an upper limit to an integrity of the first face of the gate when a pressing force is applied to the first face, the upper limit being defined by the amount of pressure being applied immediately when said integrity of the first face is compromised by the pressing force.

Another feature of the present invention is the provision in such a gated barrier, of such a method where the method includes the step of determining a keeping force of the keeper, the keeping force being defined by the amount of force required to move the gate out of the common plane with the frame lower member when the keeper is engaged to said one of the frame lower member and the frame second end.

Another feature of the present invention is the provision in such a gated barrier, of such a method where the method includes the step of selecting a keeper that has a keeping force greater than the upper limit such that the integrity of the first face of the gate is compromised before the gate moves out of the common plane with the frame lower member.

An advantage of the present invention is that the present keeper apparatus makes a gate safer. One feature contributing to this advantage is that the keeper apparatus maximizes a hold against swinging of the free end swinging lower corner portion of the gate.

Another advantage of the present invention is that the present keeper apparatus maximizes leverage. One feature contributing to this advantage is the elimination of the metal outer end of the lowermost horizontally extending support member. Another feature contributing to this advantage is the elimination of the metal lower end of the free swinging vertical support member. By eliminating the metal outer end and the metal lower end, access to the absolute corner section at the lower free end swinging corner portion is gained. Here, at the absolute corner section, the present keeper apparatus joins the metal outer end and metal lower end. Since the keeper apparatus is at the absolute corner section, it is easier to keep the gate in the plane of the barrier frame and therefor easier to minimize the pinching of fingers between the lowermost horizontally extending support member of the gate and the threshold support member of the barrier frame.

BRIEF DESCRIPTION OF THE DRAWINGS

FIG. 5A is a perspective view of the keeper apparatus of FIG. 2A engaged to a corner portion of a gate, with the keepers in a stored position.

FIG. 5B is a perspective view of the keeper apparatus of FIG. 5A, with both keepers engaging the threshold support member of a barrier frame.

FIG. 5C is a perspective view of the keeper apparatus of FIG. 3B, with both keepers engaging the standard of the barrier frame.

FIG. 5D is a partially section, partially diagrammatic view of a vertical section cut of FIG. 5B.

DESCRIPTION

Figure 1:
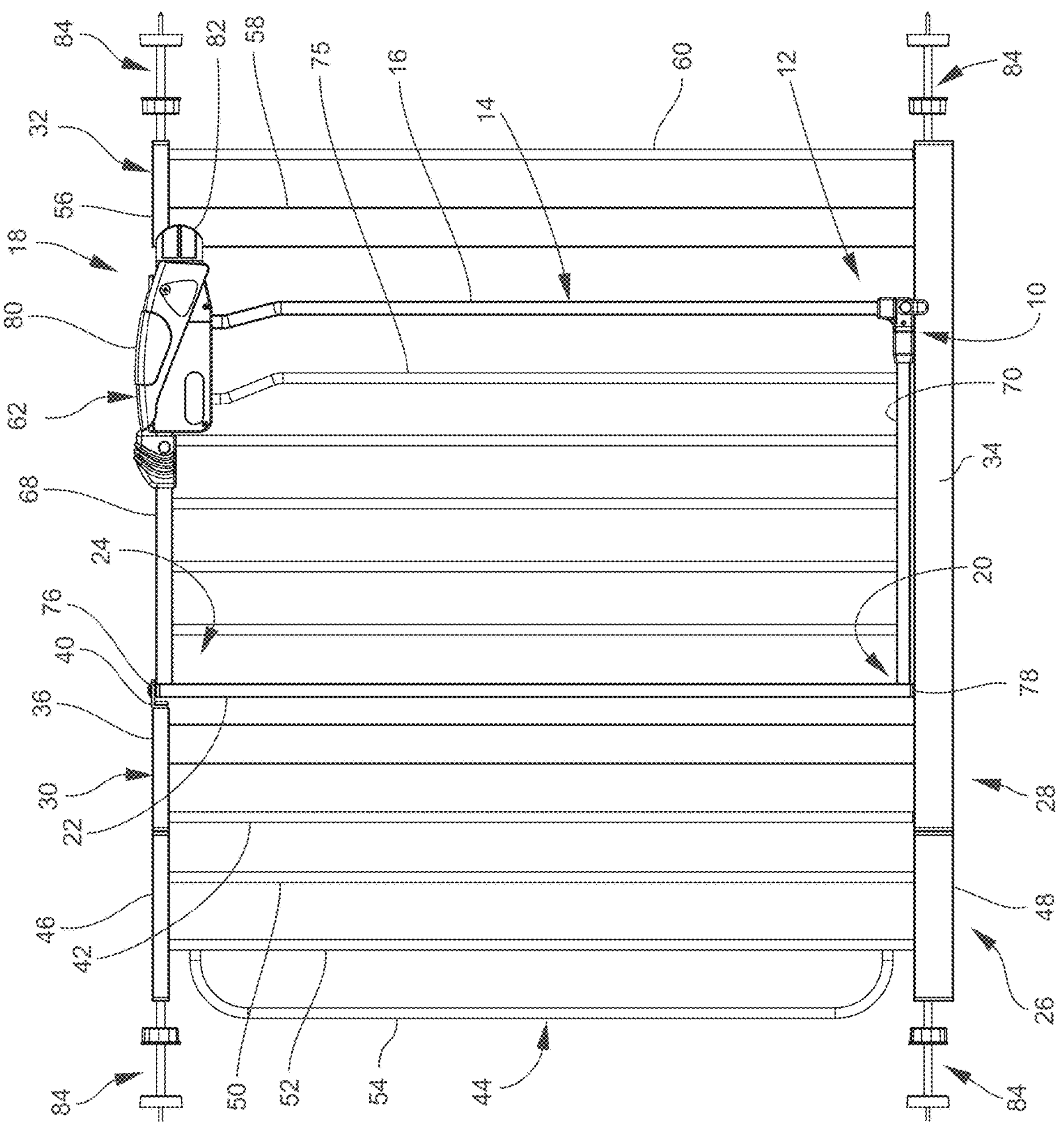
FIG. 1 is an elevation view of a gated barrier having the present keeper apparatus in the lower corner portion of the free swinging end of the gate.

As shown in FIG. 1, the present keeper apparatus is indicated by reference number 10. Keeper apparatus 10 is engaged on a corner portion 12 of a gate 14 having four corner portions, where the corner portions are the lower corner portion 12 of the free swinging end 16 of the gate 14, the upper corner portion 18 of the free swinging end 16 of the gate 14, the lower corner portion 20 of the axis end 22 of the gate 14, and the upper corner portion 24 of the axis end 22 of the gate 14.

Gate 14 is part of a gated barrier 26. Gated barrier 26 includes a barrier frame 28 having a first frame end 30, a second frame end 32, and a threshold support member 34 connecting the first and second frame ends 30, 32 to each other. Barrier frame 28 is an open top frame. Barrier frame 28 is a U-shaped frame. Gate 14 is engaged to and between first and second frame ends 30, 32.

First frame end 30 includes an upper horizontally extending support member 36 from which depends a standard 38 that is in turn engaged to the threshold support member 34. An inner end of support member 36 includes an L-shaped piece 40 that is engaged to the axis end 22 of the gate 14. First frame end 30 further includes an outer end vertically extending support member 42 fixed between outer end portions of support member 36 and threshold support member 34.

First frame end 30 further includes a removable frame extension 44. Frame extension 44 includes an upper support member 46 that engages the outer end of support member 36, a lower support member 48 that engages the outer end of threshold support member 34, an inner vertical support member 50, and an outer vertical support member 52 having a C-shaped support member 54.

Second frame end 32 includes an upper horizontally extending support 56 from which depends a standard 58 that is in turn engaged to the threshold support member 34. Second frame end 32 further includes an outer end vertically extending support member 60 fixed between outer end portions of support member 56 and threshold support member 34.

A latch apparatus 62 is fixed to gate 14 and engages the upper and inner corner portion 64 of the second frame end 32. Corner portion 64 of second frame end 32 includes sections of one or more of the standard 58 and the upper horizontally extending support member 56. Latch apparatus 62 engages and disengages the corner portion 64 of the second frame end 32.

Figure 10A:
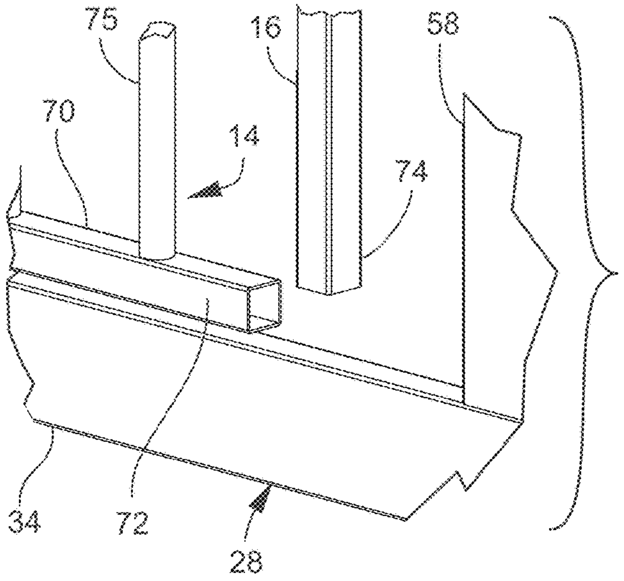
FIG. 10A is a perspective view of the lower corner portion of the free swinging end of the gate of FIG. 1, showing that the lower end of the inner end vertical support member of the gate and the inner end of the lowermost support member of the gate are spaced from each other, with the keeper apparatus of FIG. 1 having been removed.

Gate 14 includes a gate frame 66. Gate frame 66 includes an upper vertically extending frame member 68, a lowermost horizontally extending frame member 70, the free end vertically extending frame member 16, and the axis end vertically extending frame member 22. Upper vertically extending frame member 68 is fixed at one end to the upper end of axis frame member 22 and is fixed at the other end to the upper end of free end vertically extending frame member 16. Lowermost horizontally extending frame member 70 is fixed at one end to the lower end of axis end vertically extending frame member 22. The other end 72 of the lowermost horizontally extending frame member 70 is spaced from the lower end 74 of the free end vertically extending frame member 16, as shown in FIG. 10A. Ends 72, 74 are free ends until engaged by keeper apparatus 10. Gate 14 further includes a set of inner vertically extending support members 75 extending to and between upper horizontally extending support member 68 and lowermost horizontally extending support member 70 and spaced apart between axis end vertical support member 22 and free end vertical support member 16.

Gate 14 includes an upper pivot pin 76 and a lower pivot pin 78. Upper pivot pin 76 engages L-shaped piece 40 and the upper end of axis end 22. Lower pivot pin 78 engages the lower end of axis end 22 and threshold 34. Gate 14 is not liftable on the axis defined by pins 76, 78 but keeper apparatus 10 and the other keeper apparatus disclosed herein may be employed on gates that do not need to be lifted to be opened and on gates that need to be lifted to be opened.

Latch apparatus 62 includes a body 80 and a U-shaped latch 82. Body 80 engages upper horizontally extending support member 68 and two inner vertically extending support members 75, which are engaged to support member 68 at junctions internally of the body 80. Latch 82 slides into and out of body 80 to disengage and engage, respectively, the upper corner portion 18 of the second barrier end 32. U-shaped latch 82 confronts and abuts opposing faces of the upper corner portion 18.

Gated barrier 26 further includes a set of four hand wheel mechanisms 84 engaged to the outer end extension frame member 46, the outer end of extension frame member 48, the outer end of upper horizontally extending frame member 56, and the outer end of threshold support member 34. The hand wheel mechanisms 84 engage the gated barrier 26 to a vertically running surface such as the opposing door jambs in a house.

Gate barrier 26 may be a pressurized gated barrier. That is, during manufacture, second end frame 32 may be set obliquely relative to the threshold support member 34 such that the end user employs the hand wheel mechanism 84 engaged to upper horizontally extending support member 56 to push the second end frame 32 into a right angle relationship with threshold support member 34 such that U-shaped latch 82 can catch the standard 58.

Figure 2A:
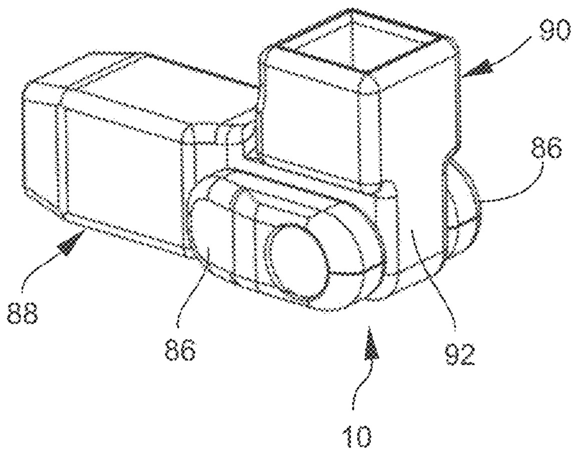
FIG. 2A is a perspective view of the keeper apparatus of FIG. 1 with the keeper of the keeper apparatus in a stored position to permit the gate to swing.

FIG. 2A shows the keeper apparatus 10. Keeper apparatus 10 includes a pair of keepers 86, a support member receiver 88, a support member receiver 90, and a base 92. The support member receivers 88, 90, or the respective axis of the support member receivers 88, 90, are set at a right angle relative to each other. The support member receivers 88, 90 and base 92 are integral and one-piece.

Figure 6:
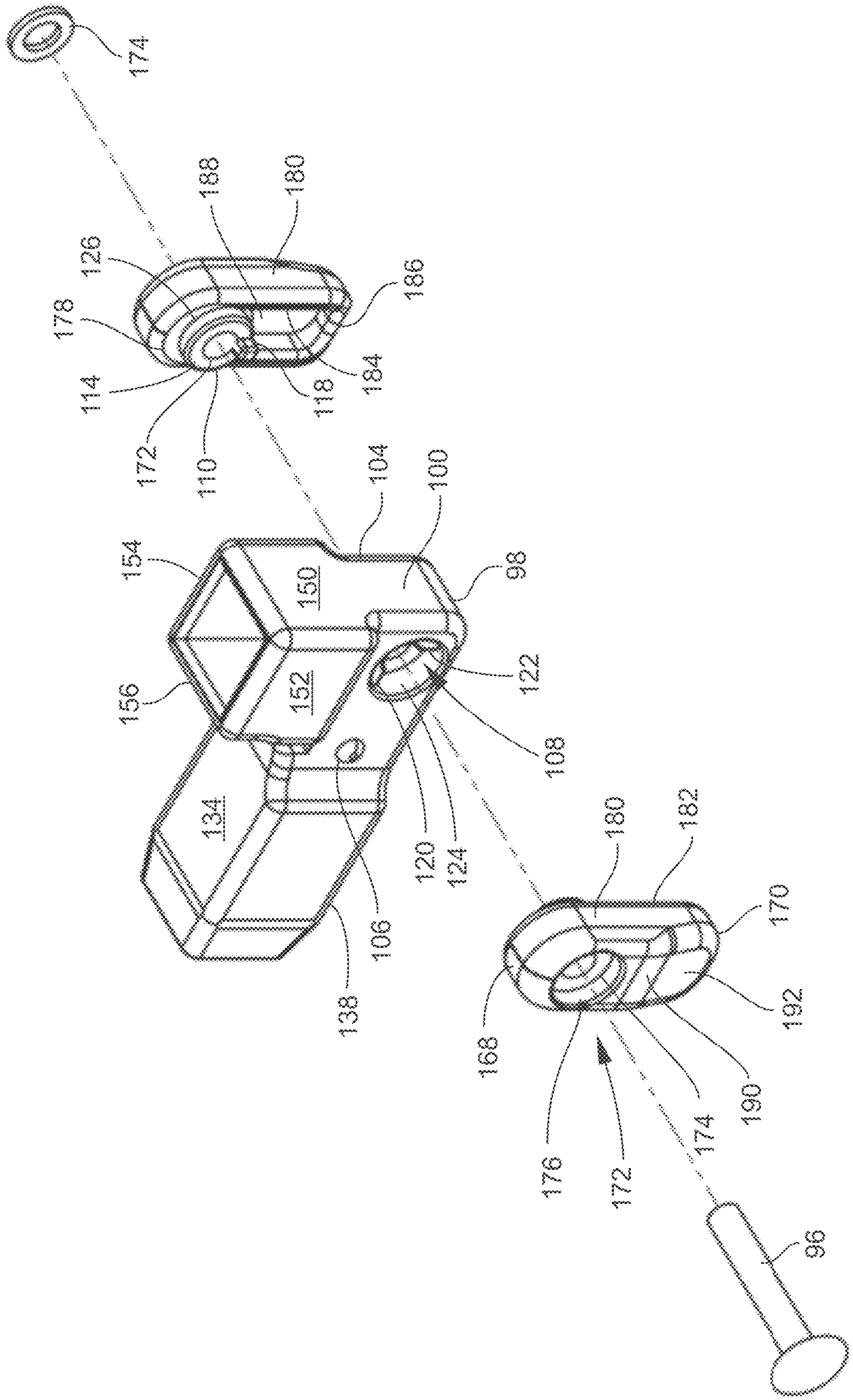
FIG. 6 is an exploded perspective view of the keeper apparatus of FIG. 1.
Figure 7A:
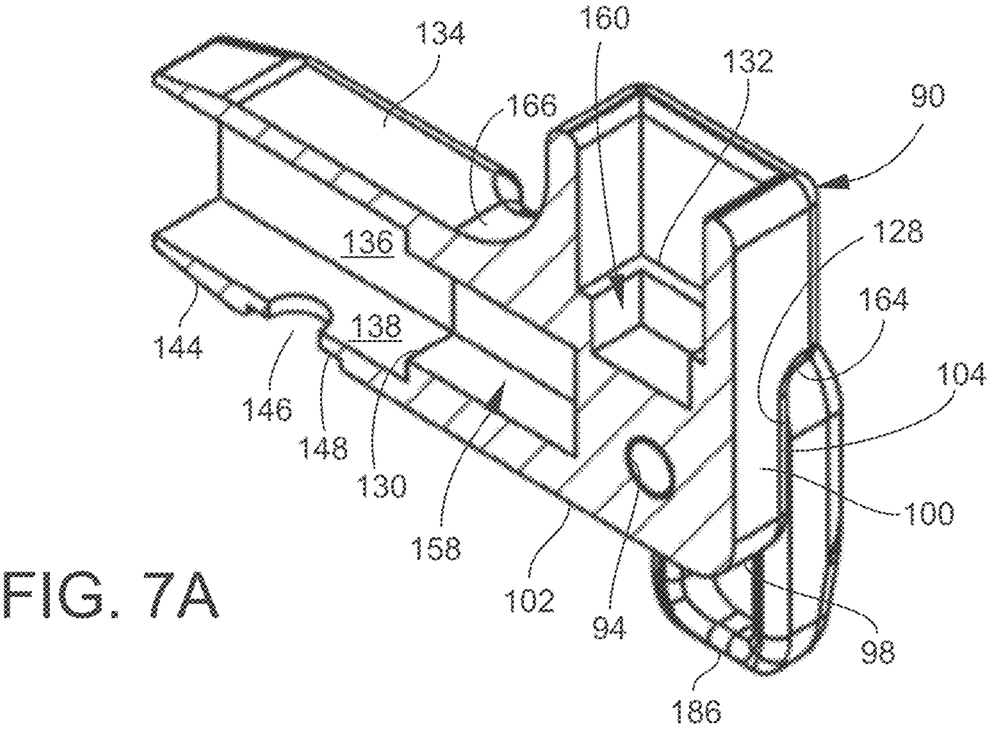
FIG. 7A is a longitudinal section view of the keeper apparatus of FIG. 1.
Figure 7B:
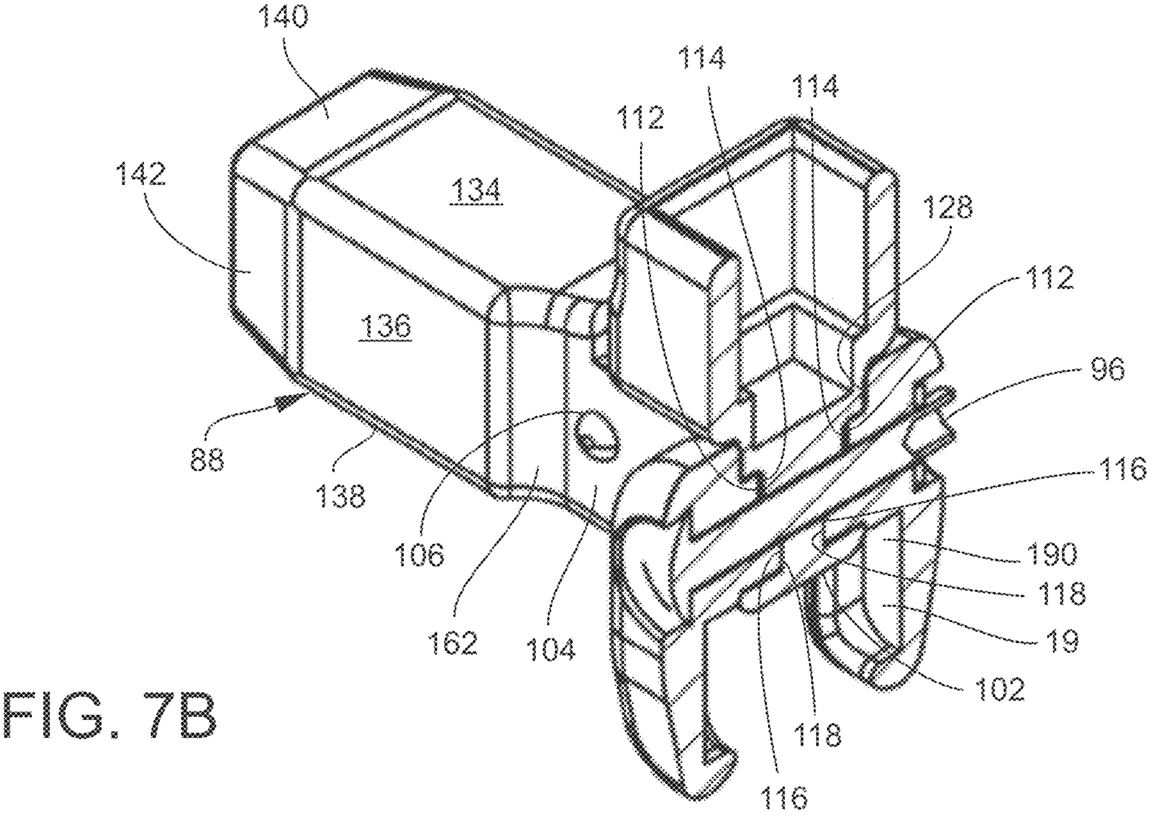
FIG. 7B is a lateral section view of the keeper apparatus of FIG. 1.
Figure 8A:
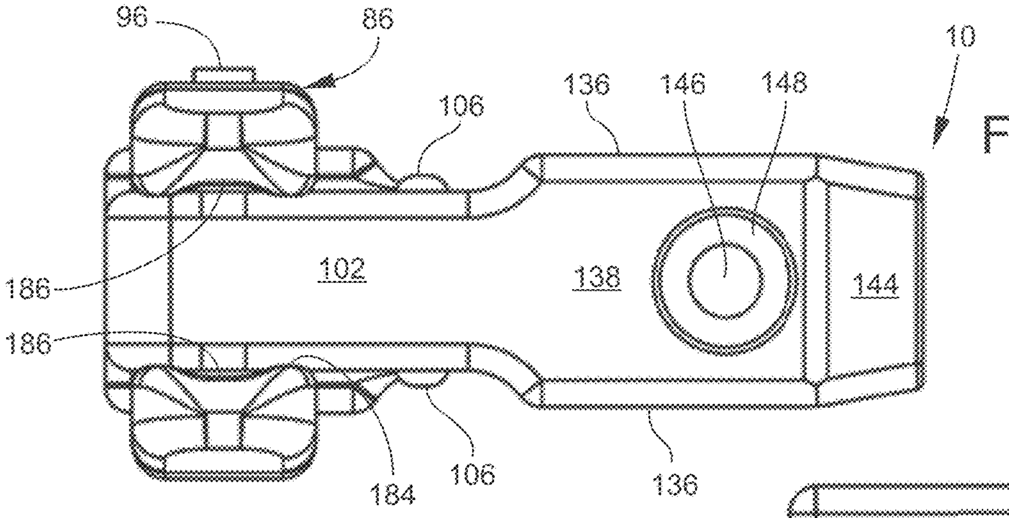
FIG. 8A is a bottom view of the keeper apparatus of FIG. 1.
Figure 8B:
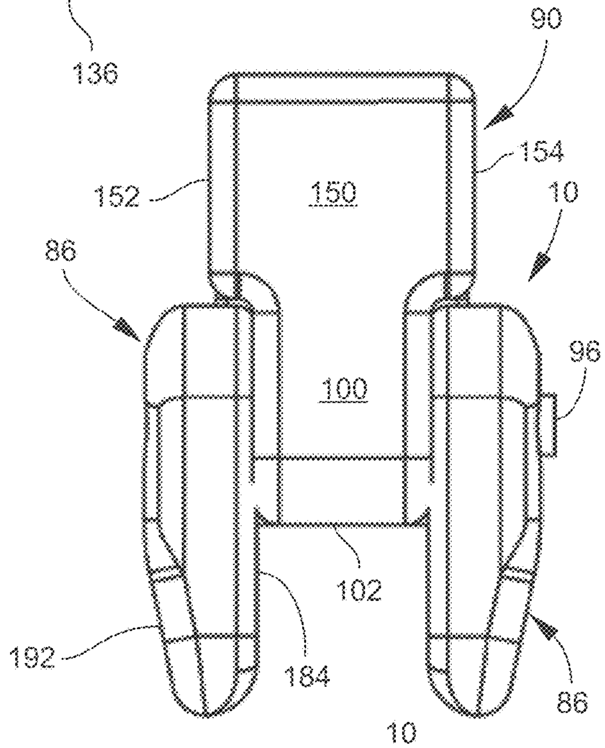
FIG. 8B is a rear end view of the keeper apparatus of FIG. 8A.
Figure 8C:
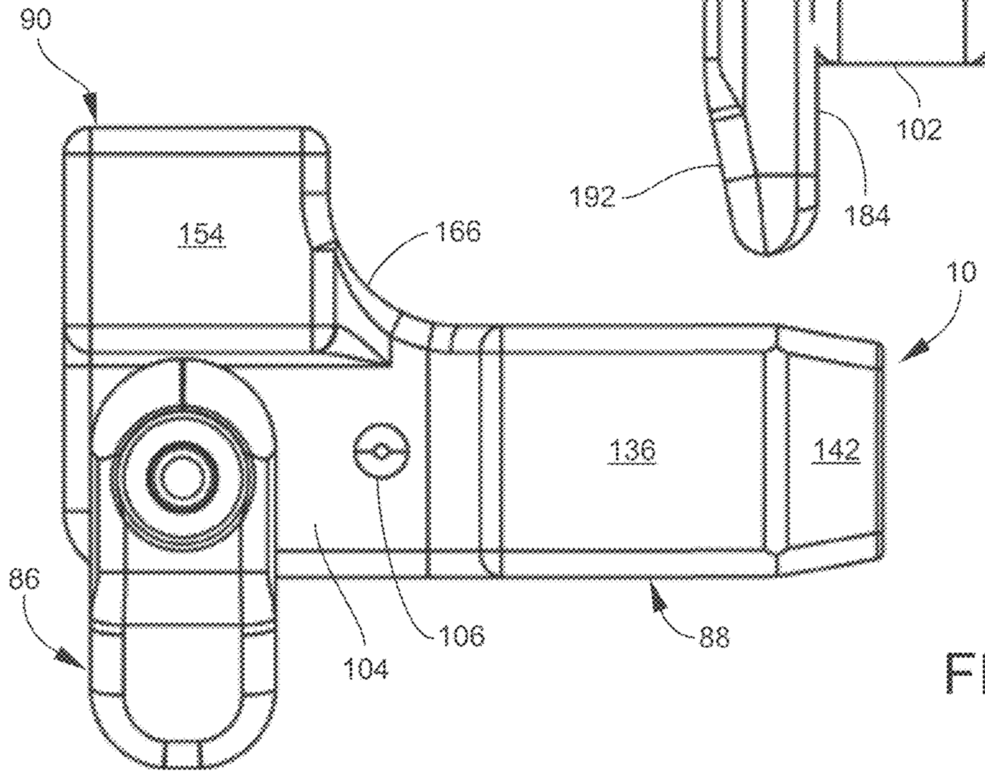
FIG. 8C is an elevation view of the keeper apparatus of FIG. 8A.
Figure 9A:
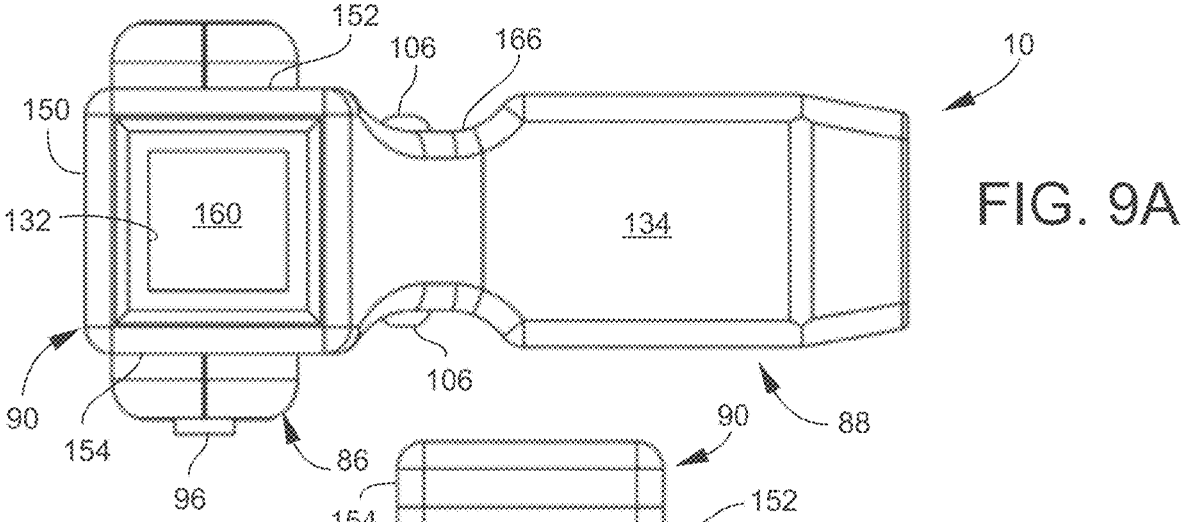
FIG. 9A is a top view of the keeper apparatus of FIG. 8A.
Figure 9B:
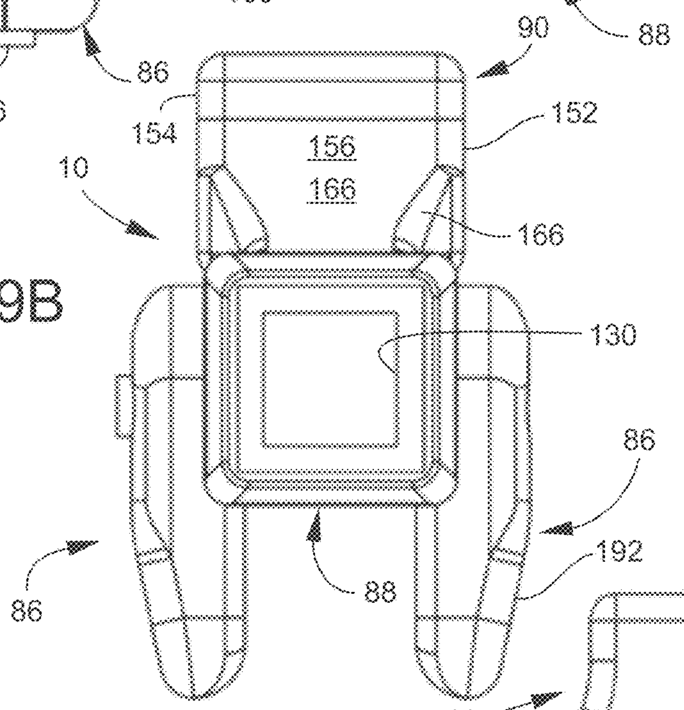
FIG. 9B is a front end view of the keeper apparatus of FIG. 8A.
Figure 9C:
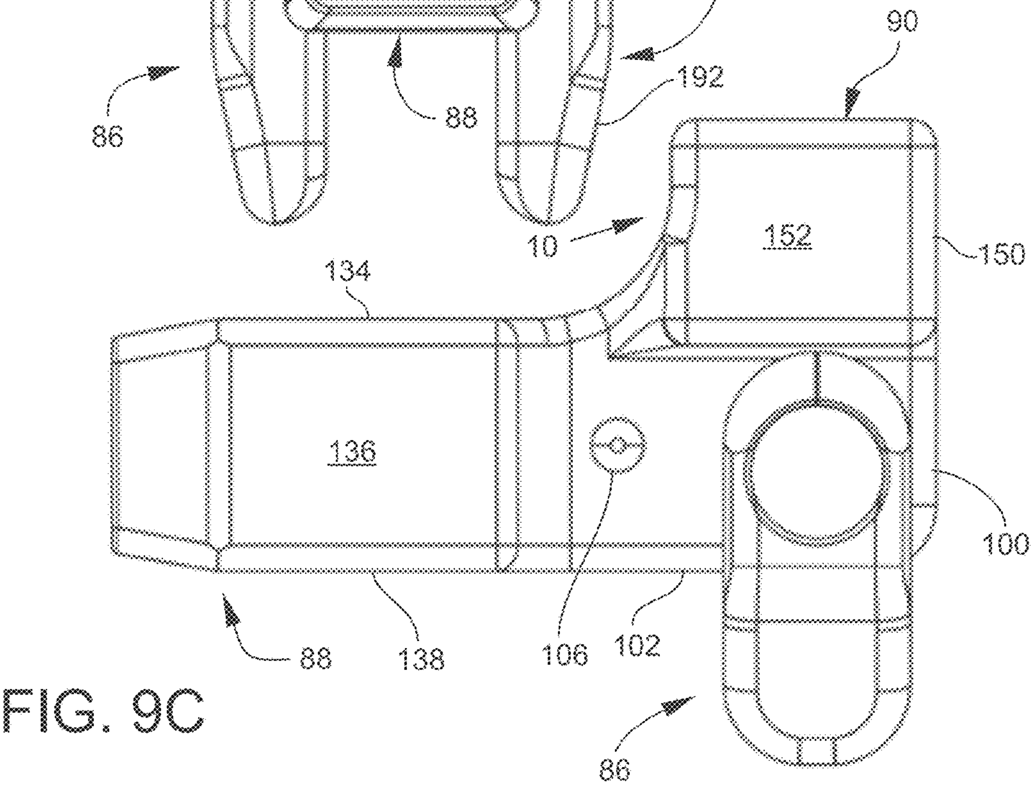
FIG. 9C is an elevation view of the keeper apparatus of FIG. 8A.

As shown in FIGS. 6, 7A, and 7B, base 92 is a block portion having a laterally extending through opening 94 formed therein for accepting a pin 96 therein. Base 92 includes a corner 98 formed by the junction of a base vertical end 100 and a base horizontal bottom 102. Base 92 includes opposing sides 104.

Each of the opposing sides 104 includes a nub 106. Nub 106 is spaced from base bottom 102 and further spaced from base end 100. Nub 106 extends laterally and outwardly from a side surface of side 104. Nub 106 is spherical or hemispherical. Nub 106 is formed in the shape of a dome. The endless sidewall of nub 106 continuously tapers toward a center top of the nub 106. The presence of nub 106 provides a roughened surface to the base side 104. Nub 106 is integral and one-piece with base 92. Nub 106 catches keeper 86 when keeper 86 is turned up.

Each of the opposing sides 104 includes a hub receiver 108 for receiving an annular hub 110 of keeper 86. Hub 110 is an annulus. Hub receiver 108 includes a first track portion 112 for receiving an annular outer face 114 of hub 110. Hub receiver 108 includes a second track portion 116 for receiving the outer end face of a stop tab 118 extending from the annular outer face 114 of the hub 108. Stop tab 118 is integral with hub 110 and keeper 86 such that when keeper 86 is rotated the stop tab 118 also rotates. The rotation of stop tab 118 is terminated twice, once by stop 120 and once by stop 122. Second track portion 116 is a circular groove formed in base 92 that extends for slightly more than 90 degrees such that when keeper 86 is rotated, the axis of the keeper 86 swings for 90 degrees. Second track portion 116 has a greater depth than first track portion 112. Stops 120, 122 define walls extending at right angles to the second track portion 116 at opposite ends of the second track portion 116. First track portion 112 and second track portion 116 have the same radius relative to pin 96. Hub receiver 108 includes a cylindrical sidewall 124 that confronts and abuts a cylindrical sidewall 126 of hub 108. Hub 110 includes an inner surface that rides on the surface of side 104 of base 92.

Base 92 includes an interior rectangular edge 130 that abuts and works as a stop for the free end 72 of the lowermost horizontally extending support member 70. Base 92 includes an interior rectangular edge 132 that abuts and works as a stop for the free end 74 of the free end support member 16.

Support receiver 88 extends integrally from base 92. Support receiver 90 extends integrally from base 92 at a right angle from support receiver 88.

Support receiver 88 is a tube that includes a top 134, two opposing sides 136, and a bottom 138. Top 134 runs parallel to bottom 138. Sides 136 run parallel to each other. Sides 136 extend at right angles to the top 134 and bottom 138. Each of the top 134, sides 136 and bottom 138 includes a respective tapering surface portion 140, 142 and 144 that tapers inwardly toward an axis of the tube of the support receiver and away from the base 92.

Bottom 138 of support receiver 88 receives a pin shaft opening 146 about which is formed an annular inset 148 for the head of the pin. After the free end 72 is slid into the support receiver 88, a pin in opening 146 engages the keeper apparatus 10 to the lowermost horizontally extending support member 70. Such pin also extends into an opening formed in the bottom of the free end 72 of the lowermost horizontally extending support member 70.

Support receiver 90 is a tube that includes an outer end side 150, a front side 152, a rear side 154, and an inner end side 156. Outer end side 150 runs parallel to inner end side 156. Front and rear sides 152, 154 run parallel to each other. Front and rear sides 152, 154 extend at right angles to the outer end side 150 and inner end side 156.

Base 92 includes a parallelepiped empty space 158 communicating with support receiver 88 and a parallelepiped empty space 160 communicating with support receiver 88. Edge 130 extends between the support receiver 88 and space 158. Edge 132 extends between the support receiver 90 and space 160.

Support receiver 88 has a greater width than does base 92. Sides 136 are set apart by a first distance and base sides 104 are set apart by a second distance. The first distance is greater than the second distance. A curved transition section 162 extends from the inner end of side 136 to the front end of side 136.

Support receiver 90 has a greater width than does base 92. Front and rear sides 152, 154 are set apart by a third distance and base sides 104 are set apart by a second distance. The third distance is greater than the second distance. Support receiver 90 includes an edge 164 between the front and rear sides 152, 154 and the base sides 104.

The front to back width of support receiver 88 is the same as the front to back width of support receiver 90 such that the above referenced first distance is equal to the above referenced third distance.

The bottom surface of bottom 138 of support receiver 88 is coplanar with the bottom surface of base bottom 102.

The top surface of top 134 of support receiver 88 leads into a curved transition surface 166 that in turn leads into the inner end side 156 of support member receiver 90. Each of base 92 and the inner end side 156 includes sections of the curved transition surface 166. Front and rear edges of the curved transition surface curve inwardly from the top 134 and then outwardly to the inner end side 156.

The outer end side 150 of support member receiver 90 is coplanar with the base outer end 100.

Keeper 86 is formed generally in an oblong shape. Keeper 86 includes a proximal end portion 168 and a distal end portion 170. The proximal end 168 includes a pin opening 172 for the shaft of the pin 96 and further includes an inset defined by an inset annular floor 174 and an inset cylindrical sidewall 176. The inset receives either the permanent head of the pin 96 or the fixture opposite the head, such as another head in the case of a rivet, or a pressure fit annular fixture 174 as shown in FIG. 6.

The proximal end portion 168 further includes the hub 110, formed in the shape of an annulus with stop tab 118. The hub 110 extends from a base 178 having an annular face that surrounds the hub 110 and that has a diameter greater than the diameter of the hub 110. Base 178 also includes the pin opening 94.

Keeper 86 includes an endless sidewall 180 and base 178 is tucked into the proximal end portion of the endless sidewall 180. The annular face of base 178 is coplanar with an endless edge 182 of the endless sidewall 180. Endless sidewall 180 has two opposing straight edge portions 184 that clickingly slide over the nub 106 rising from base side 104. Endless sidewall 180 further includes a front slightly concave or inwardly curving distal end edge portion 186. A distal underside region 188 of the keeper 86 is shaped in the form of a receptacle and is bounded by the inner surfaces of the endless sidewall 180 associated with straight edge portions 184, the distal end edge portion 186, and the distal portion of hub base 178. Nub 106 is received in this receptacle like region 188 between the distal portion of hub base 178 and distal edge portion 186 and between straight edge portions 184. A floor 190 of this receptacle like region 188 includes a tapering portion 192. Floor 190 is distal of the inset sidewall 176, with the floor 90 tapering distally and inwardly toward the distal end of the endless sidewall 180. Keeper 86 is one-piece and integral.

The keepers 86 are pivotal relative to body 92 such that keepers 86 operate independently of each other. However, if desired, keepers 86 may be set to operate dependently such that turning one keeper 86 also turns the other keeper 86 and such may be effected by including a stop tab on the underside of each of the heads of pin 96 and engaging this stop tab with a cut-out in the annular inset floor 174 such that turning one keeper 86 turns annular inset floor 174, which turns its stop tab, which in turn turns its pin head, which in turn turns the pin, which turns the stop tab of the other pin, which turns the annular inset floor of the other keeper 86, which in turn rotates keeper 86.

FIG. 2A shows the keepers 86 in a stored position where stop tab 188 engages stop 120. In this position, the distal end portion 170 of the keeper 86 is adjacent to transition portion 162 and the endless sidewall 180 confronts and abuts side 104 of the base. In this position, nub 106 is between the straight edge sections 184 of the sidewall 180 and is in region 188, proximally of distal end edge 186.

Figure 2B:
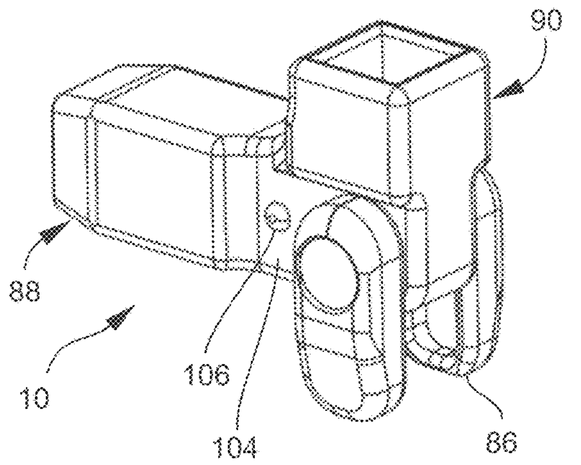
FIG. 2B is a perspective view of the keeper apparatus of FIG. 2A with both of the keepers in an operating position.

FIG. 2B shows the keepers 86 in their operating position, where the distal end portions 170 confront and abut the vertical faces of the threshold member 34 to minimize movement of the gate 14 and to minimize movement of the corner portion 12 of the gate 14. By minimizing movement of the corner portion 12 of the gate 14, movement of the gate 14 as a whole is minimized because the other three corner portions 18, 20, 24 already have been fixed. Conventionally, without the present keeper apparatus disclosed herein, corner portion 12 is free to move. When the keepers 86 are in the down or operating position, the distal end portions 170 of the keepers 86 confront each other and the regions 188 confront each other under the base bottom 102. When the keepers 86 are in the down or operating position, stop tab 118 engages stop 122. When the keepers 86 are in the down or operating position, nub 106 is exposed.

Figure 2C:
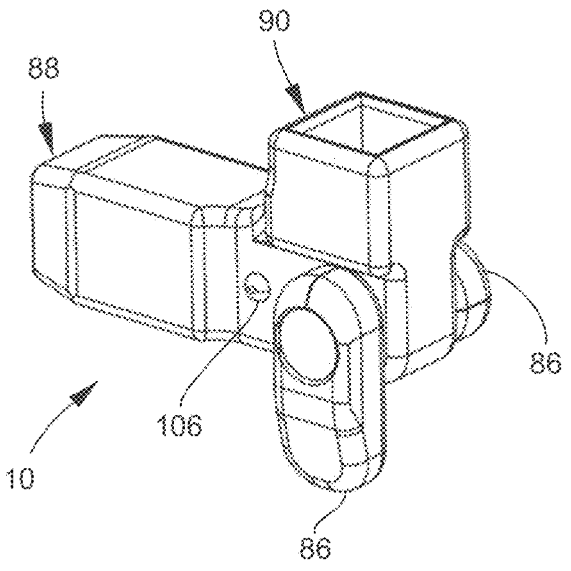
FIG. 2C is a perspective view of the keeper apparatus of FIG. 2A with one of the keepers in an operating positon and with the other keeper in a stored position.
Figure 2D:
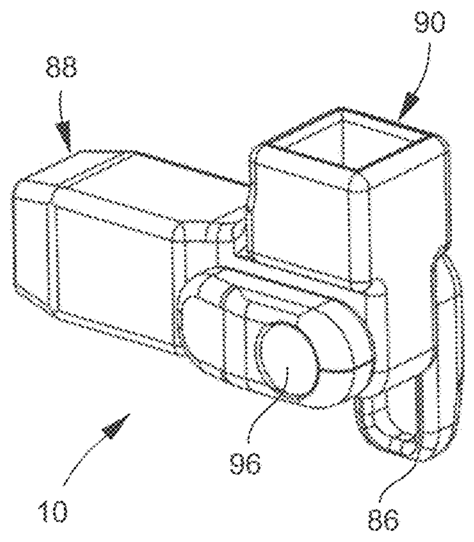
FIG. 2D is a perspective view of the keeper apparatus of FIG. 2A with one of the keepers in an operating positon and with the other keeper in a stored position.

FIG. 2C shows one of the keepers 86 in the operating and down position and the other of the keepers 86 in the stored position. FIG. 2D shows the opposite case. Each of the base sides 104 includes the nub 106.

Figure 3A:
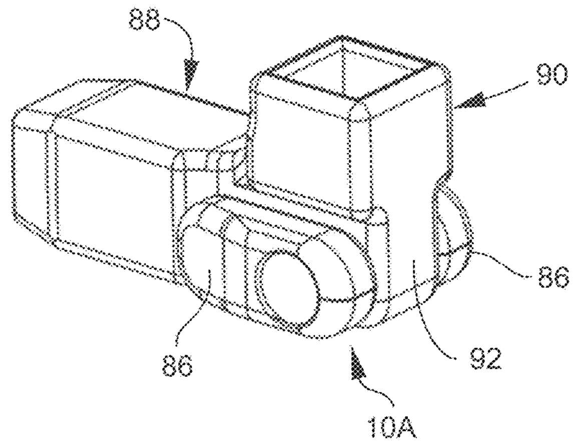
FIG. 3A is a perspective view of an alternate embodiment of the keeper apparatus of FIG. 1, with both of the keepers of the keeper apparatus in a stored position to permit the gate to swing.
Figure 3B:
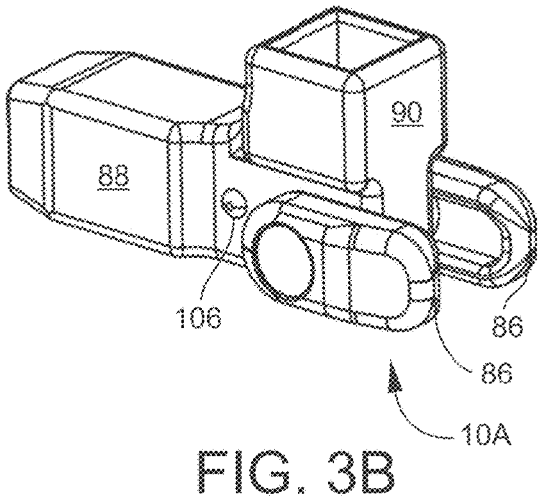
FIG. 3B is a perspective view of the keeper apparatus of FIG. 3A with both of the keepers in an operating position.
Figure 3C:
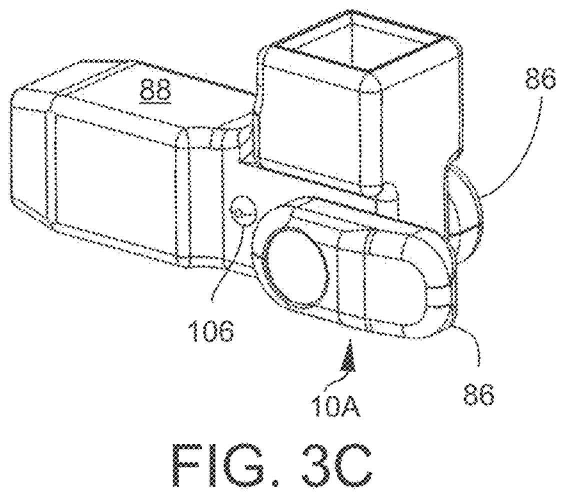
FIG. 3C is a perspective view of the keeper apparatus of FIG. 3A with one of the keepers in an operating positon and with the other keeper in a stored position.
Figure 3D:
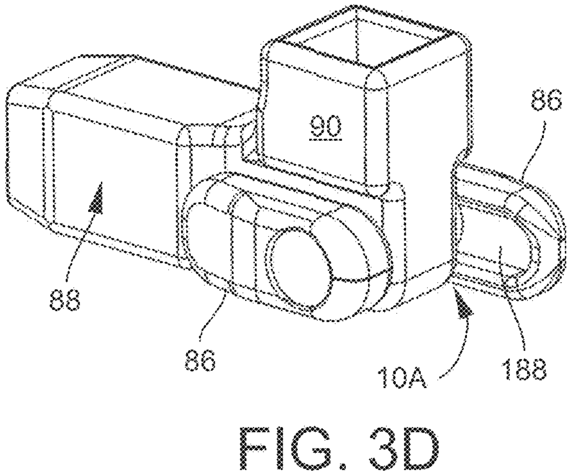
FIG. 3D is a perspective view of the keeper apparatus of FIG. 3A with one of the keepers in an operating positon and with the other keeper in a stored position.

The keeper apparatus 10A of FIG. 3A is identical to the keeper apparatus 10 of FIG. 2A except the base 92 of the keeper apparatus 10A of FIG. 3A includes a stop 122 that has been moved diametrically opposite of stop 120 such that, as shown in FIGS. 3B, 3C and 3D, keeper 86 can capture the standard 12, where the standard 12 is set closer to the free end gate 16, such as shown in FIG. 5C. Groove 118 is also lengthened to extend slightly more than 180 degrees such that keeper 86 can make a full 180 degree swing. The stored position of the keeper 86 and the operating and horizontal position of the keeper 86 are diametrically opposite of each other relative to the shaft of the pin 96. In the stored position of the keeper 86 of keeper apparatus 10A, one straight edge portion 184 of sidewall 180 is adjacent to and parallel to edge 164 of support member receiver 90. In the operating and horizontal position of keeper 86 of keeper apparatus 10A, the other straight edge portion 184 of sidewall 180 is adjacent to and parallel to edge 164 of support member receiver 90.

Figure 4A:
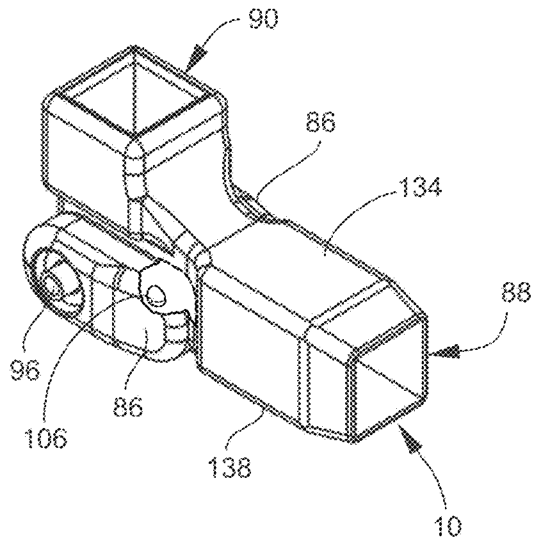
FIG. 4A is a perspective view of an alternate embodiment of the keeper apparatus of FIG. 1, with both keepers in a stored position, where the axis of the keepers traverses the threshold support receiver.
Figure 4B:
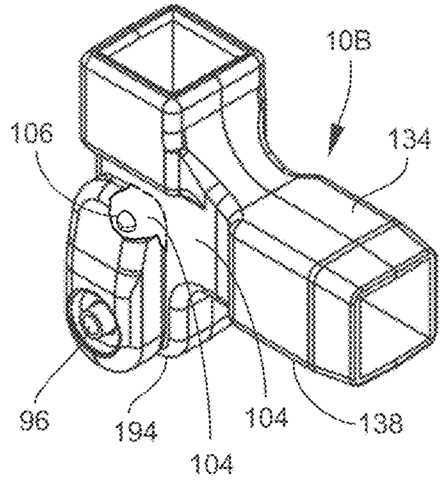
FIG. 4B is a perspective, partially broken away, view of an alternate embodiment of the keeper apparatus of FIG. 1, with both keepers in a stored position, where the axis of the keepers is disposed at an altitude less than the underside of the threshold support receiver.
Figure 4C:
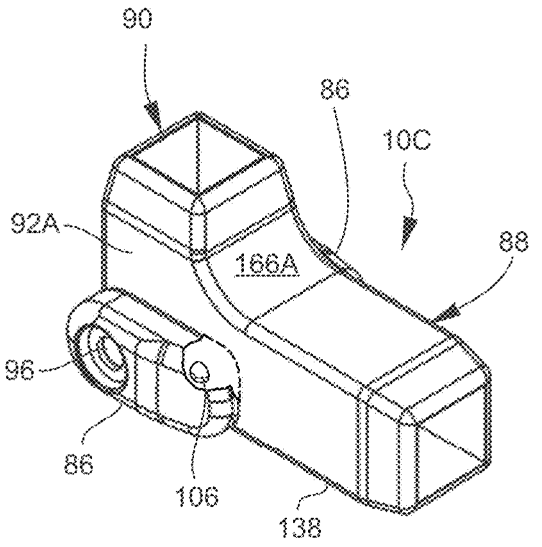
FIG. 4C is a perspective, partially broken away, view of an alternate embodiment of the keeper apparatus of FIG. 1, with both keepers in a stored position, where the axis of the keepers traverses the threshold support receiver.
Figure 4D:
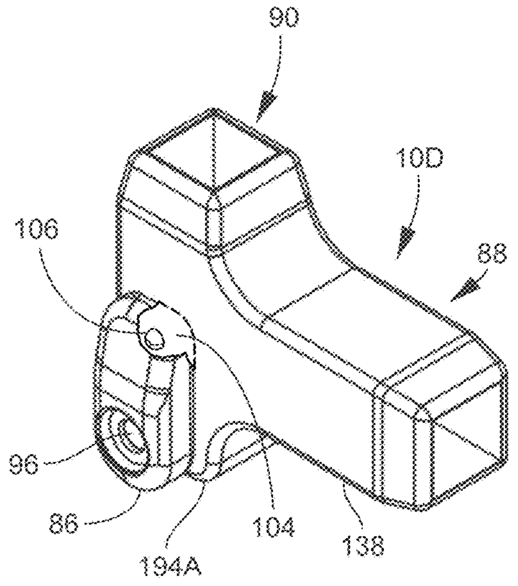
FIG. 4D is a perspective view of an alternate embodiment of the keeper apparatus of FIG. 1, with both keepers in a stored position, where the axis of the keepers is disposed at an altitude less than the underside of the threshold support receiver.

FIG. 4A shows keeper apparatus 10 of FIGS. 1, 2A, 2B, 2C, 2D, 6, 7A and 7B so that it can be viewed in comparison to keeper apparatus 10B of FIG. 4B, keeper apparatus 10C of FIG. 4C, and keeper apparatus 10D of FIG. 4D. Keeper apparatus 10A, 10B, 10C, and 10D are the same as keeper apparatus 10 except where noted.

Keeper apparatus 10 includes a support member receiver 88 having a top 134 and a bottom 138. Top 134 and bottom 138 define planes that are parallel to each other and that capture pin 96. Bottom 138 and base bottom 102 define a plane and keeper pin 96 is disposed above this plane. In keeper 10B, base 92 includes a bottom extension 194. Bottom extension 194 extends directly opposite of support member receiver 90. Bottom extension 194 contains pin opening 94 and hub receptor 108. Bottom extension 194 is a block like extension that is integral and one-piece with the block of base 92. Pin opening 94 and hub receptor 108 are disposed below the plane of the bottom 138 in keeper apparatus 10B. Nub 106 is still on base side 104 except that nub 106 has been moved to a position on base side 104 above pin opening 172 in base 92 to a position vertically aligned with pin opening 172. Stop 122 stays in the same position as on keeper apparatus 10 except that stop 120 is moved to about the twelve o'clock position, or slightly toward the one o'clock position for one keeper 86, or slightly toward the eleven o'clock position for the other keeper 86 such that stops 120, 122 are generally diametrically opposite of one another such that keeper 86 swings for a complete 180 degrees. Keepers 86 of keeper apparatus 10B swing between a vertical upwardly directed stored position and a vertical downwardly directed operating position. Keeper apparatus 10B is employed where the lowermost gate support member 70A or 70B is spaced apart from the threshold 34A or 34B, as shown respectively in FIGS. 14B and 15B.

As shown in FIG. 4C, keeper apparatus 10C includes a base 92A and a transition 166A having a width that is the same as support member receivers 88, 90.

As shown in FIG. 4D, keeper apparatus 10D includes base extension 194A except that base extension 194A is now the same width as base 92A and transition 166A. Nub 106 is positioned at the same location as with keeper apparatus 10B in FIG. 4B. As with keeper apparatus 10B, keeper apparatus 10D includes a position for pin 96 that is below the plane of the bottom of support member receiver 88. Keeper apparatus 10D, like keeper apparatus 10B, is employed where the lowermost gate support member 70A or 70B is spaced apart from the threshold 34A or 34B, as shown respectively in FIGS. 14B and 15B.

FIG. 5A is a detail view of keeper apparatus 10 on a gate 14 having a free end vertical support member 16 set adjacent to a standard 58. FIG. 5B is a detail view of keeper apparatus 10 on the gate 14 of FIG. 5A where the free end vertical support member 16 is set adjacent to a standard 58, where keepers 86 are in the downward and operating position. FIG. 5C is a detail view of keeper apparatus 10A of FIGS. 3A, 3B, 3C, and 3D on the gate 14 of FIG. 5A where the gate 14 and standard 58 are set adjacent to a standard 58.

FIG. 5D is a section, diagrammatic view of the keeper apparatus 10 with the keepers 86 in the operating position. FIG. 5D shows that keeper apparatus 10 keeps the free end vertical support member 16 and threshold support member 34 in the same plane when keepers 86 are engaged. Straight edge sections 184 confront and abut the opposing faces of the threshold support member 34 and the end 74 of free end vertical support member 16 is engaged tightly and with a friction fit in support member receiver 90 such that gate 14 is maintained in a plane with threshold 34 and standard 58 and barrier frame 28 and swinging of gate 14 is minimized.

FIGS. 8A, 8B, 8C, 9A, 9B, and 9C show keeper apparatus 10, described above. Keeper apparatus 10 is shown from all six sides in the above views with the keepers 86 in the downward and operating position.

FIG. 10A shows a gate 14 having free ends 72, 74 for the lowermost support member 72 and free end vertical support member 16, respectively. Each of keeper apparatus 10, 10A, 10B, 10C, and 10D receive such free ends 72, 74.

Figure 10B:
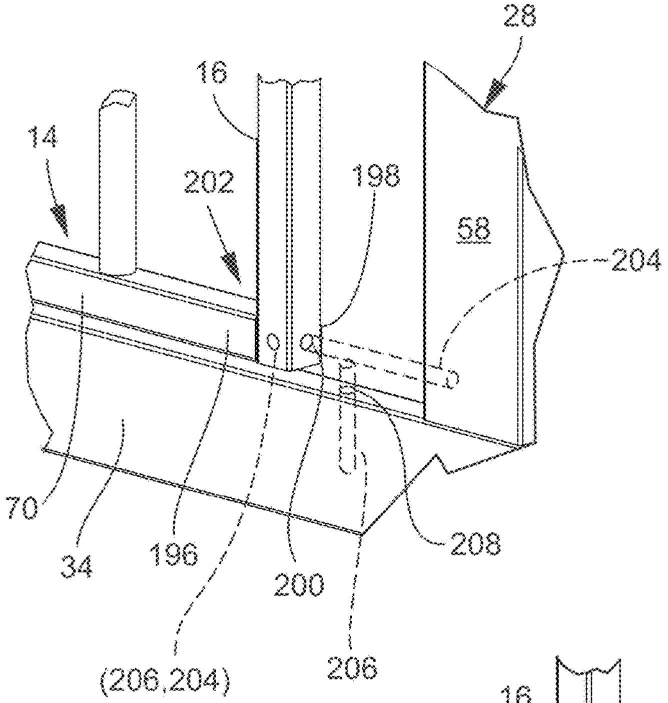
FIG. 10B shows a pin opening on a lower corner portion of the free swinging end of a gate that may be employed by one of the present keeper embodiments.

FIG. 10B shows that lowermost horizontally extending support member 70 has a fixed outer end 196 that is fixed to lower end 198 of free end swinging support member 16 so as to form a lower end free swinging corner portion 202. The lower end 198 includes a pin opening 200 for engaging a straight pin 204 that engages standard 58 through an opening in the inner edge of standard 58. Pin opening 200 may alternatively engage a bent or curved pin 206 that extends from pin opening 200 to pin opening 208 formed in the upper edge of threshold support member 34. Outer end 196 is fixed to the inside face of lower end 198. Straight pin 204 is a keeper. Bent pin 206 is a keeper.

Figure 10C:
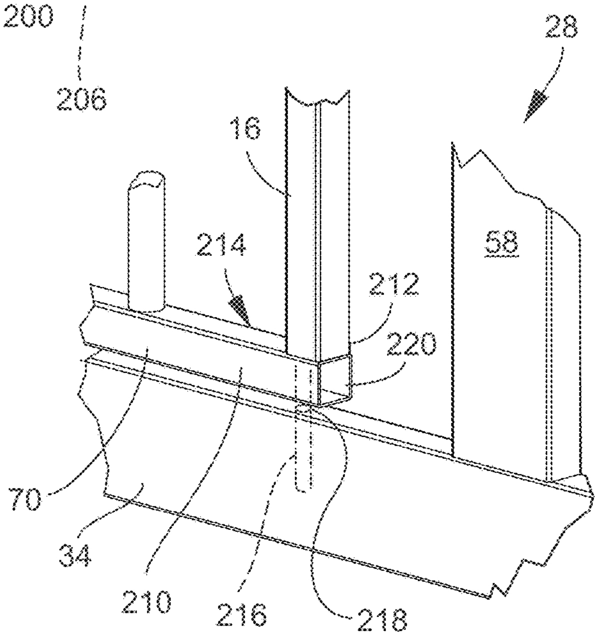
FIG. 10C shows a pin opening on a lower corner portion of the free swinging end of a gate that may be employed by one of the present keeper embodiments.

FIG. 10C shows that lowermost horizontally extending support member 70 has a fixed outer end 208 that is fixed to lower end 212 of free end swinging support member 16 so as to form a lower end free swinging corner portion 214. The bottom of outer end 210 includes a pin opening for engaging a straight pin 216 that engages threshold support member 34 through an opening 218 in the top of the threshold support member 34. Straight pin 216 may be accessed and operated through end opening 220 in the open end of lowermost support member 70. Lower end 212 is fixed to the upper face of outer end 210. Straight pin 216 is a keeper.

Figure 11A:
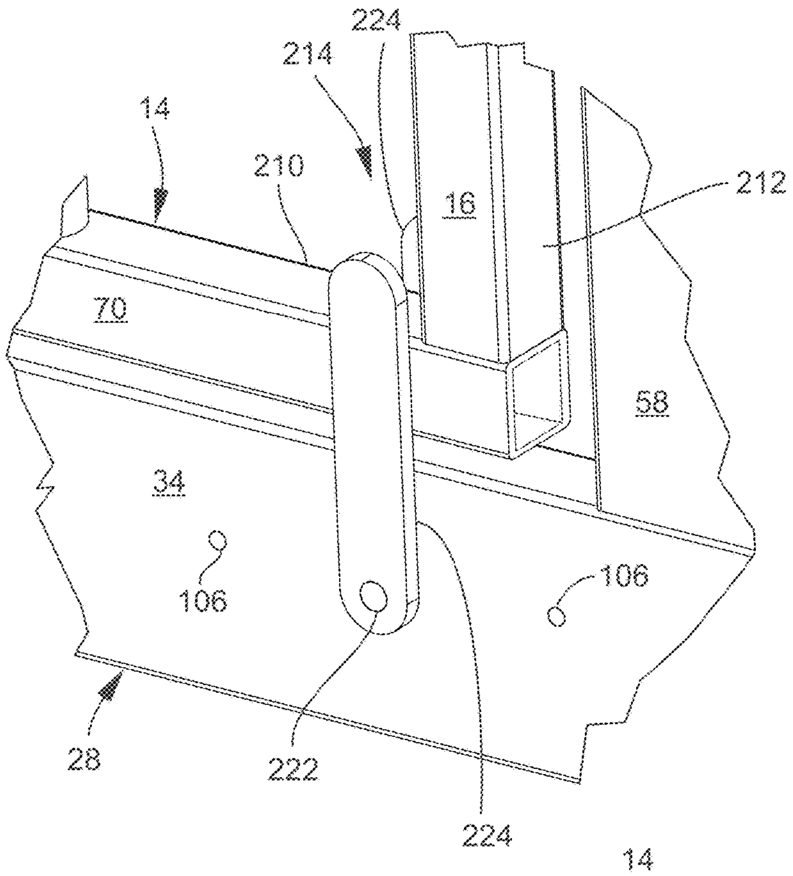
FIG. 11A is a perspective view of an alternate keeper apparatus embodiment.
Figure 11B:
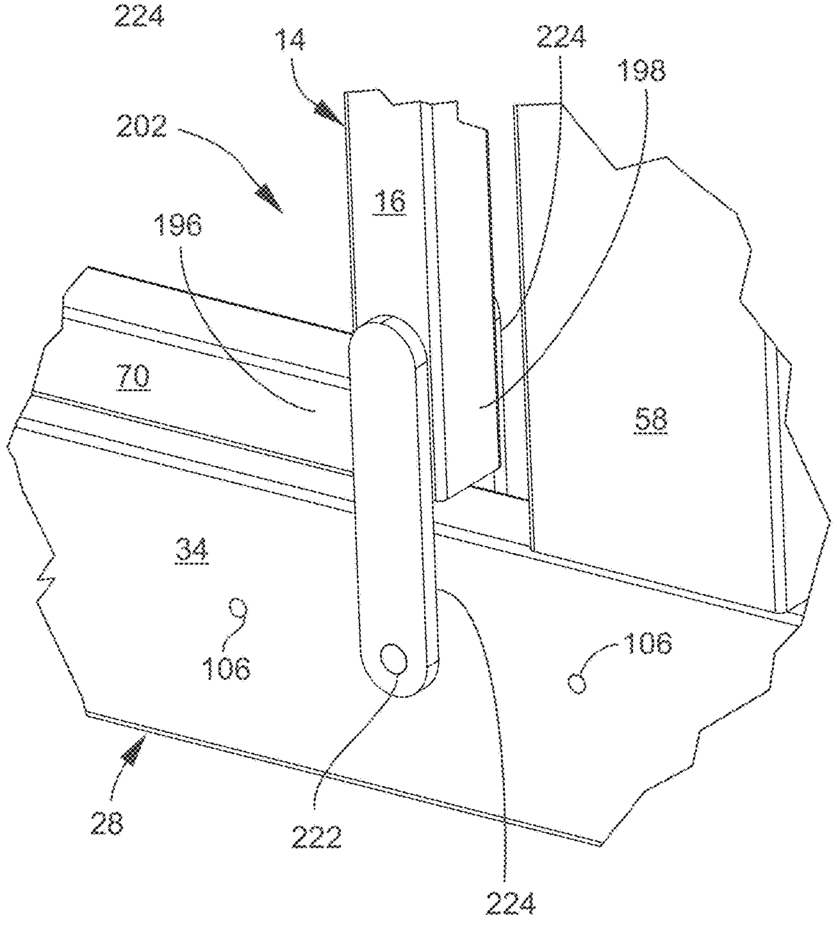
FIG. 11B is a perspective view of an alternate keeper apparatus embodiment.

Each of FIGS. 11A and 11B shows a pair of flat bar keepers 222 pivotally affixed to threshold support member 34. The keepers 222 engage lower end 210 in FIG. 11A and lower end 198 in FIG. 11B. Keepers 222 may pivot independently of each other or keepers 222 may pivot together in a dependent fashion. Keepers 222 can pivot either way 90 degrees to stored position. The face of outer end 210 can have a nub 106 engaging the underside of the distal end of keeper 224. The face of lower end 198 can have a nub 106 engaging the underside of the distal end of keeper 224.

It should be noted that the embodiment of FIG. 11B is preferable over the embodiment of FIG. 11A because the keepers 224 are positioned as close as possible to the absolute ends of each of support members 16, 70 in FIG. 11B. Lesser force is required to hold the gate 14 in the plane of the threshold member 34 in the embodiment shown in FIG. 11B. The following embodiments hold the lower free end swinging corner portion 12 very close to the phantom absolute ends of vertical support member 16 and horizontal support member 70: those embodiments shown in FIGS. 1, 2A, 2B, 2C, 2D, 3A, 3B, 3C, 3D, 4A, 4B, 4C, 4D, 5A, 5B, 5C, 5D, 6, 7A, 7B, 8A, 8B, 8C, 9A, 9B, and 9C.

It should be noted that other embodiments can also have nubs 106 on not only the base 92 but also on the barrier frame 28, such as on the opposing faces of the threshold support 34 or on the opposing faces of the standard 58 so as to hold keepers 86 in the operating position as well as the stored position. These other embodiments are shown in FIGS. 1, 2A, 2B, 2C, 2D, 3A, 3B, 3C, 3D, 4A, 4B, 4C, 4D, 5A, 5B, 5C, 5D, 6, 7A, 7B, 8A, 8B, 8C, 9A, 9B, and 9C.

Figure 12A:
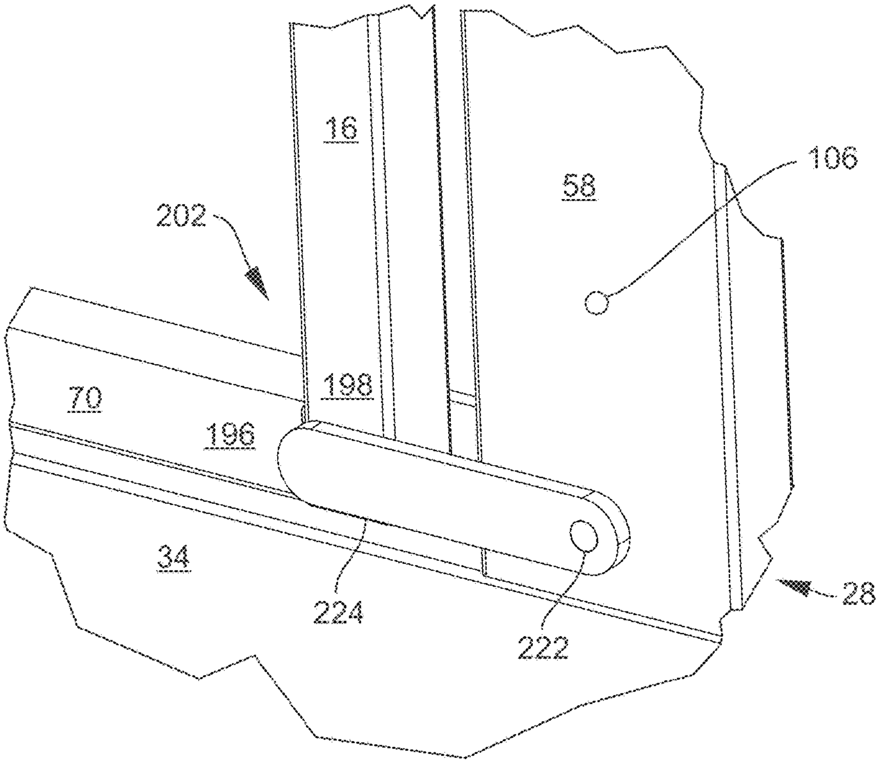
FIG. 12A is a perspective view of an alternate keeper apparatus embodiment.
Figure 12B:
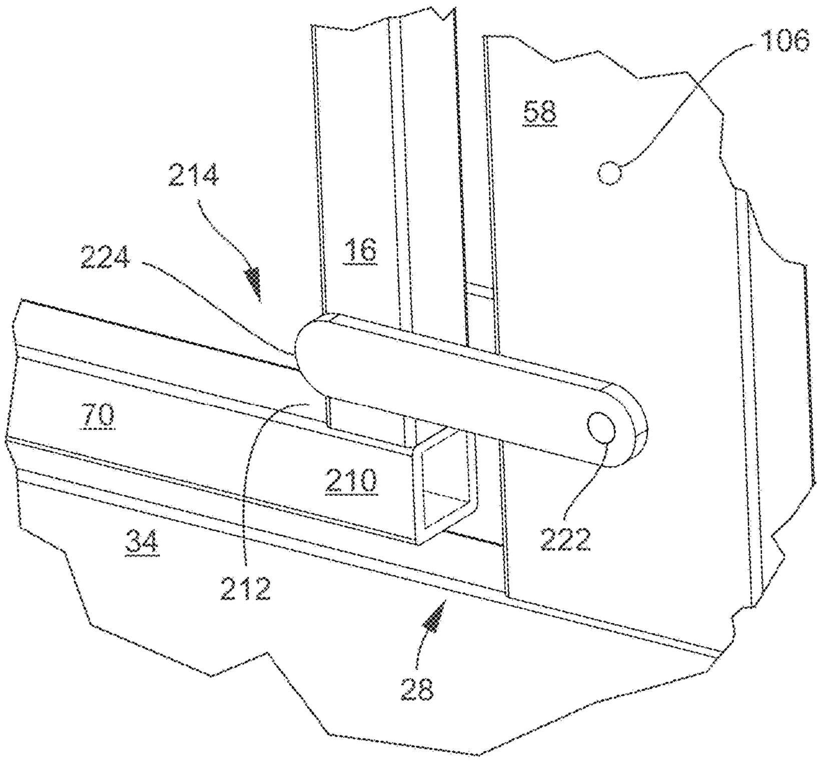
FIG. 12B is a perspective view of an alternate keeper apparatus embodiment.

FIG. 12A shows the keepers 224 of FIGS. 11A and 11B except that the pivot 222 is engaged to the standard 58. Again, the keeper embodiment shown in FIG. 12A is preferred over the keeper embodiment of FIG. 12B because the keeper embodiment of FIG. 12A positions the distal end of the keeper 224 at the absolute end 198 of vertical support member 16. In the keeper embodiment of FIG. 12B, the absolute end 210 of support member 70 forms the peak of the corner portion 214 but no set of keepers are engaging such.

Figure 13A:
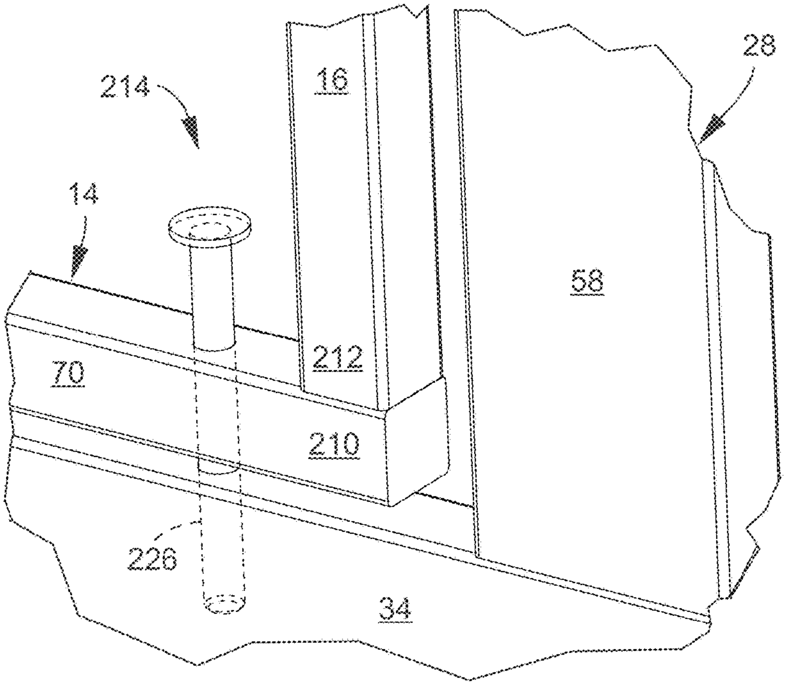
FIG. 13A is a perspective view of an alternate keeper apparatus embodiment.
Figure 13B:
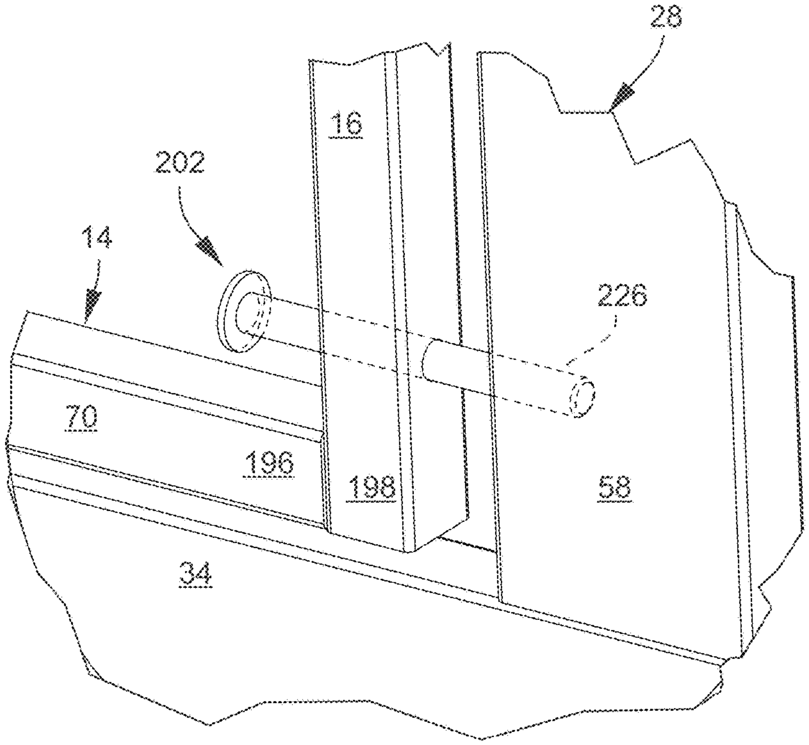
FIG. 13B is a perspective view of an alternate keeper apparatus embodiment.

FIGS. 13A and 13B show that a pin 226 can act as a keeper. In FIG. 13A, pin 226 engages outer end 210 and threshold 34. In FIG. 13B, pin 226 engages lower end 198 and standard 58.

Figure 14A:
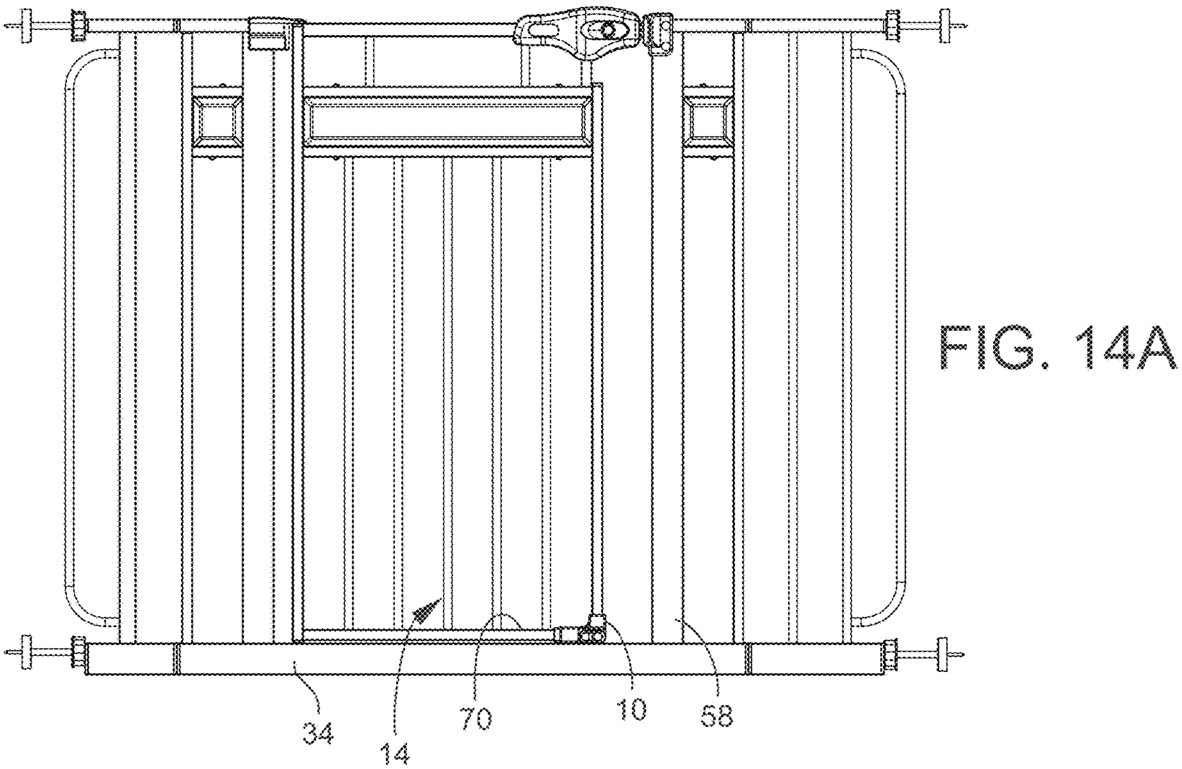
FIG. 14A is an elevation view of a gate having a relatively small distance between the lowermost support member of the gate and the threshold support member of the barrier frame.
Figure 15A:
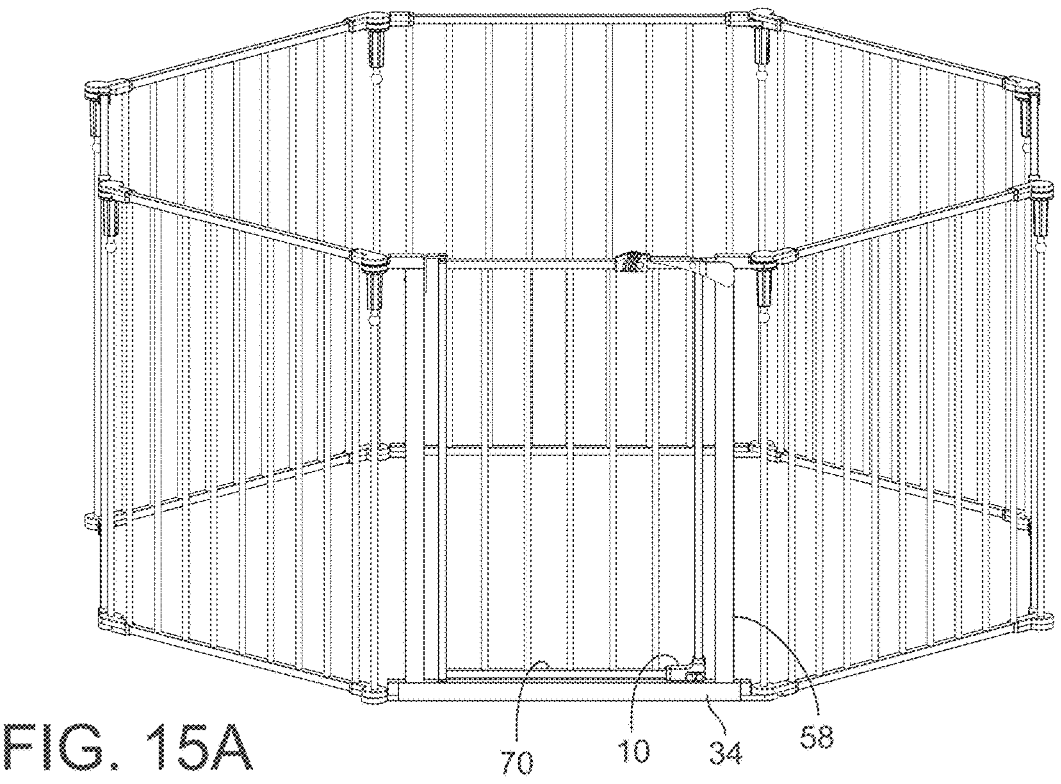
FIG. 15A is an elevation view of a gate having a relatively small distance between the lowermost support member of the gate and the threshold support member of the barrier frame.

In FIGS. 14A and 15A, keeper apparatus 10 is employed because lowermost horizontally extending support member 70 and threshold support member 34 are set relatively closely together. In FIGS. 14A and 15A, keeper apparatus 10C may also be employed.

Figure 14B:
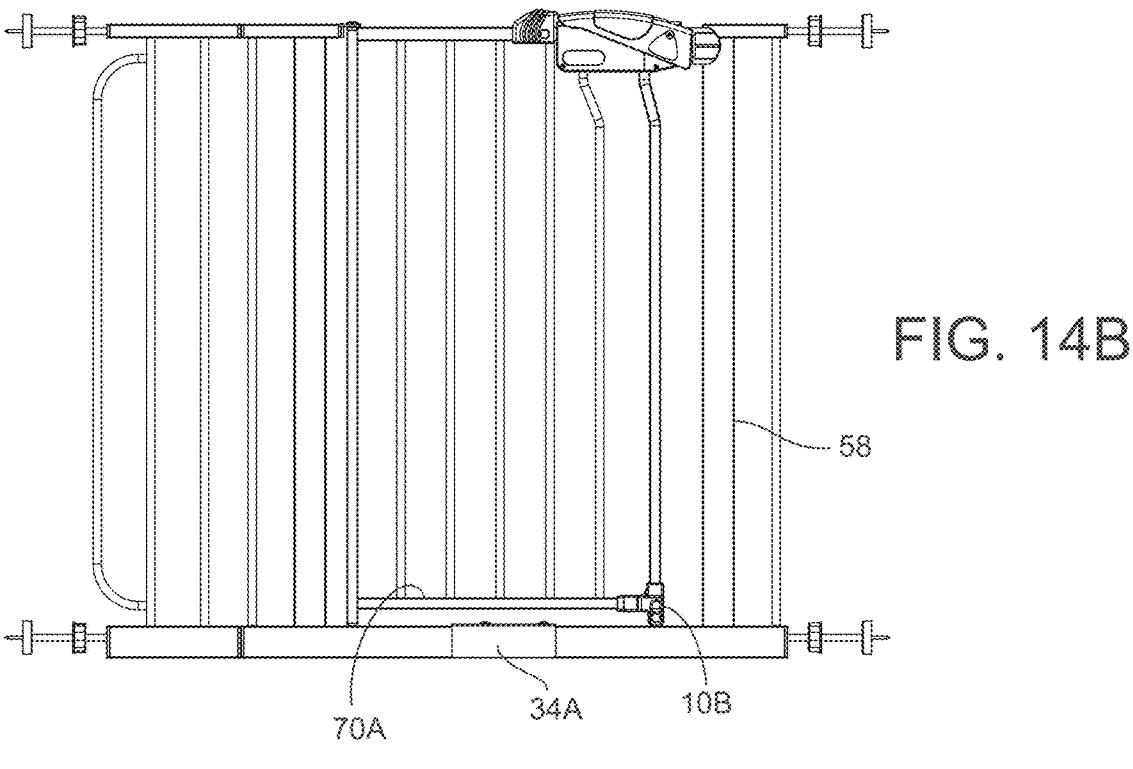
FIG. 14B is an elevation view of a gate having a relatively large distance between the lowermost support member of the gate and the threshold support member of the barrier frame.
Figure 15B:
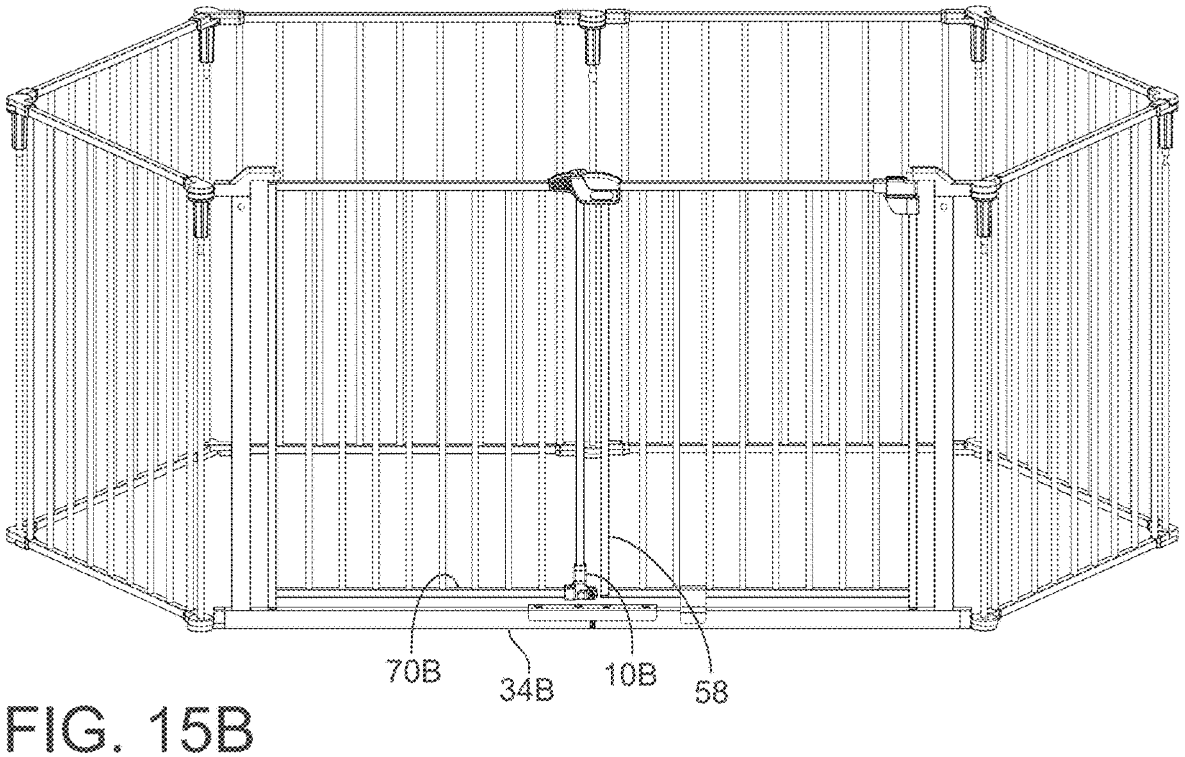
FIG. 15B is an elevation view of a gate having a relatively large distance between the lowermost support member of the gate and the threshold support member of the barrier frame.

In FIGS. 14B and 15B, keeper apparatus 10B is employed because lowermost horizontally extending support member 70 and threshold support member 34 are set relatively far apart. In FIGS. 14B and 15B, keeper apparatus 10D may also be employed.

FIGS. 14A, 14B, 15A, 15B also show that the keeper apparatus disclosed herein are not limited to the type of gated barrier shown in FIG. 1.

In operation, after gate 14 is closed and latch 62 is operated such that latch 82 captures the upper end of the second barrier frame end 32, keepers 86 are turned to their operating positions to each of the faces of threshold support member 34. This holds the corner portion 12 and the gate 14 as a whole in the plane of the threshold support member 34, minimizing the chances of infants, toddler, children, or adults catching their fingers between the lowermost horizontally extending support member 70 of gate 14 and the threshold support member 34. When it is desired to open the gate, the keepers 86 can be turned up to their stored positions by snapping the keepers 86 over the nubs 106, thereby permitting the gate 14 to swing after the latch 62 has been opened.

The present invention includes a method for holding a gate in position with a minimal of movement relative to a frame, where the frame includes first and second frame ends and a frame lower member extending between the first and second frame ends, where the gate is in the frame, where the gate confronts the first and second frame ends, where the gate swingably engages the first frame end, and where the gate is latchable to the second frame end. The method includes a keeper on at least one of the gate and frame, where the keeper is engagable between the gate and at least one of the frame lower member and frame second end to keep the gate engaged to the frame and to keep the gate in a common plane with the frame lower member, and where the keeper is disengagable between the at least one of the frame lower member and frame second end to permit the gate to swing relative to the frame.

The method includes the step of determining a first strength of a first face of the gate, where the first strength is determined by an upper limit to an integrity of the first face of the gate when a pressing force is applied to the first face, and where the upper limit is defined by the amount of pressure being applied immediately when the integrity of the first face is compromised by the pressing force.

The method further includes the step of determining a keeping force of the keeper, where the keeping force is defined by the amount of force required to move the gate out of the common plane with the frame lower member when the keeper is engaged to such one of the frame lower member and such frame second end.

The method further includes the step of selecting a keeper that has a keeping force greater than the upper limit such that the integrity of the first face of the gate is compromised before the gate moves out of the common plane with the frame lower member.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A barrier comprising:

a) a gate, the gate swingably engaged to a first portion of the barrier, the gate being latchable to a second portion of the barrier;

b) a keeper apparatus on the gate and including first and second keepers, the first and second keepers being engagable between the gate and a third portion of the barrier to keep the gate from swinging and to keep the gate in a common plane with the third portion of the barrier, the first and second keepers being disengagable between the third portion of the barrier and the gate to permit the gate to swing relative to the third portion of the barrier;

c) a latch between the gate and the second portion of the barrier, wherein the latch and each of the first and second keepers must be disengaged relative to the second and third portions of the barrier prior to the gate being swingable both ways relative to the second and third portions of the barrier;

d) wherein the gate includes a gate corner portion, the keeper apparatus being on the gate corner portion;

e) wherein each of the first and second keepers pivots to an out-of-the-way position to permit the gate to swing;

f) wherein the gate corner portion includes a first gate portion and a second gate portion extending transversely to the first gate portion;

g) wherein the gate corner portion includes a first side and a second side, the first keeper being on the first side and the second keeper being on the second side;

h) a first nub on one of the first side and first keeper and a first nub receptacle on the other of the first side and first keeper, the first nub being engagable with the first nub receptacle when the first keeper is in the out-of-the-way position; and i) a second nub on one of the second side and second keeper and a second nub receptacle on the other of the second side and second keeper, the second nub being engagable with the second nub receptacle when the second keeper is in the out-of-the-way position.

2. The barrier of claim 1, wherein the first nub slidingly and clickingly engages the first nub receptacle and wherein the second nub slidingly and clickingly engages the second nub receptacle.

3. The barrier of claim 1, wherein the first nub snappingly engages the first nub receptacle and wherein the second nub snappingly engages the second nub receptacle.

4. The barrier of claim 1, wherein, when the first and second keepers are engagable between the gate and the third portion of the barrier to keep the gate from swinging and to keep the gate in the common plane with the third portion of the barrier, one of the first nub and first nub receptacle is exposed to view and one of the second nub and second nub receptacle is exposed to view.

5. The barrier of claim 1, wherein the first gate portion includes a first gate portion axis and wherein the second gate portion includes a second gate portion axis, the axes intersecting at a location, the first nub and first nub receptacle being adjacent to said location when the first nub and first nub receptacle are engaged to each other, the second nub and second nub receptacle being adjacent to said location when the second nub and second nub receptacle are engaged to each other.

6. The barrier of claim 1, wherein the first gate portion includes an uppermost face defining an uppermost face plane, wherein the second gate portion includes an innermost face defining an innermost face plane, the uppermost face plane intersecting the innermost face plane at a location, the first nub and first nub receptacle being adjacent to said location when the first nub and first nub receptacle are engaged to each other, the second nub and second nub receptacle being adjacent to said location when the second nub and second nub receptacle are engaged to each other.

7. The barrier of claim 6, wherein said location is immediately inwardly of the innermost face plane.

8. A barrier comprising:

a) a gate, the gate swingably engaged to a first portion of the barrier, the gate being latchable to a second portion of the barrier;

b) a keeper apparatus on the gate and including first and second keepers, the first and second keepers being engagable between the gate and a third portion of the barrier to keep the gate from swinging and to keep the gate in a common plane with the third portion of the barrier, the first and second keepers being disengagable between the third portion of the barrier and the gate to permit the gate to swing relative to the third portion of the barrier;

c) a latch between the gate and the second portion of the barrier, wherein the latch and each of the first and second keepers must be disengaged relative to the second and third portions of the barrier prior to the gate being swingable both ways relative to the second and third portions of the barrier;

d) wherein the gate includes a gate corner portion, the keeper apparatus being on the gate corner portion;

e) wherein each of the first and second keepers pivots to an out-of-the-way position to permit the gate to swing;

f) wherein the gate corner portion includes a first gate portion, a second gate portion extending transversely to the first gate portion, and a piece;

g) the piece receiving the first and second gate portions, the piece being one-piece and integral, the keeper apparatus being engaged to said piece; and h) wherein the piece includes a first side and a second side, the first keeper being on the first side and the second keeper being on the second side, and further comprising:

i) a first nub on one of the first side and first keeper and a first nub receptacle on the other of the first side and first keeper, the first nub being engagable with the nub receptacle when the first keeper is in the out-of-the-way position; and ii) a second nub on one of the second side and second keeper and a second nub receptacle on the other of the second side and second keeper, the second nub being engagable with the nub receptacle when the second keeper is in the out-of-the-way position.

9. The barrier of claim 8, wherein the first nub slidingly and clickingly engages the first nub receptacle and wherein the second nub slidingly and clickingly engages the second nub receptacle.

10. The barrier of claim 8, wherein the first nub snappingly engages the first nub receptacle and wherein the second nub snappingly engages the second nub receptacle.

11. The barrier of claim 8, wherein, when the first and second keepers are engagable between the gate and the third portion of the barrier to keep the gate from swinging and to keep the gate in the common plane with the third portion of the barrier, one of the first nub and first nub receptacle is exposed to view and one of the second nub and second nub receptacle is exposed to view.

12. The barrier of claim 8, wherein the first gate portion includes a first gate portion axis and wherein the second gate portion includes a second gate portion axis, the axes intersecting at a location, the first nub and first nub receptacle being adjacent to said location when the first nub and first nub receptacle are engaged to each other, the second nub and second nub receptacle being adjacent to said location when the second nub and second nub receptacle are engaged to each other.

13. The barrier of claim 8, wherein the first gate portion includes an uppermost face defining an uppermost face plane, wherein the second gate portion includes an innermost face defining an innermost face plane, the uppermost face plane intersecting the innermost face plane at a location, the first nub and first nub receptacle being adjacent to said location when the first nub and first nub receptacle are engaged to each other, the second nub and second nub receptacle being adjacent to said location when the second nub and second nub receptacle are engaged to each other.

14. The barrier of claim 13, wherein said location is immediately inwardly of the innermost face plane.

* * * * *